United States Patent
Iha et al.

(10) Patent No.: US 10,465,755 B2
(45) Date of Patent: Nov. 5, 2019

(54) ELECTROMAGNETIC CLUTCH

(71) Applicant: DENSO CORPORATION, Kariya, Aichi-pref. (JP)

(72) Inventors: Satoshi Iha, Kariya (JP); Toshihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 15/738,152

(22) PCT Filed: Jul. 12, 2016

(86) PCT No.: PCT/JP2016/070544
§ 371 (c)(1),
(2) Date: Dec. 20, 2017

(87) PCT Pub. No.: WO2017/010479
PCT Pub. Date: Jan. 19, 2017

(65) Prior Publication Data
US 2018/0180115 A1    Jun. 28, 2018

(30) Foreign Application Priority Data

Jul. 13, 2015 (JP) .................................. 2015-139705

(51) Int. Cl.
    *F16D 13/76* (2006.01)
    *F16D 27/112* (2006.01)
    *F16D 27/00* (2006.01)

(52) U.S. Cl.
    CPC ............ *F16D 27/112* (2013.01); *F16D 13/76* (2013.01); *F16D 2027/007* (2013.01)

(58) Field of Classification Search
CPC ... F16D 27/112; F16D 13/76; F16D 2027/007
See application file for complete search history.

(56) References Cited

U.S. PATENT DOCUMENTS

| | | | |
|---|---|---|---|
| 6,209,699 | B1 | 4/2001 | Hayashi et al. |
| 2002/0074204 | A1 | 6/2002 | Nakagawa et al. |
| 2011/0127136 | A1* | 6/2011 | Sakuraba ............... F16D 27/112 |
| | | | 192/66.31 |

FOREIGN PATENT DOCUMENTS

| | | |
|---|---|---|
| JP | H11-351282 A | 12/1999 |
| JP | 2004-293734 A | 10/2004 |

(Continued)

*Primary Examiner* — Jacob S. Scott
*Assistant Examiner* — Lillian T Nguyen
(74) *Attorney, Agent, or Firm* — Posz Law Group, PLC

(57) ABSTRACT

An electromagnetic clutch includes: a driving-side rotatable body that is rotated about an axis of a rotatable shaft of a drive-subject device; and a driven-side rotatable body that is placed on one side of the driving-side rotatable body in an axial direction. The electromagnetic clutch includes a flat spring that is formed to be rotatable integrally with the rotatable shaft of the drive-subject device and is joined to the driven-side rotatable body. The electromagnetic clutch includes a blocking member that is installed to the flat spring. A primary through-hole is formed in the driven-side rotatable body. A secondary through-hole is formed in the flat spring. Switching between coupling and decoupling between driving-side rotatable body and the driven-side rotatable body is made through elastic deformation of the flat spring. The blocking member closes the secondary through-hole.

7 Claims, 26 Drawing Sheets

(56) References Cited

FOREIGN PATENT DOCUMENTS

JP          2015-206375  A    11/2015
KR    10-2011-0018699  A      2/2011

* cited by examiner

ELECTROMAGNETIC CLUTCH

CROSS REFERENCE TO RELATED APPLICATIONS

This application is a U.S. national phase of International Application No. PCT/JP2016/070544 filed on Jul. 12, 2016 and is based on and incorporates herein by reference Japanese Patent Application No. 2015-139705 filed on Jul. 13, 2015.

TECHNICAL FIELD

The present disclosure relates to an electromagnetic clutch.

BACKGROUND ART

Previously, there is proposed an electromagnetic clutch of this kind that transmits a rotational drive force, which is outputted from a vehicle drive engine, to a compressor of a refrigeration cycle (see, for example, the patent literature 1).

This electromagnetic clutch has a cover that covers an outside of the electromagnetic clutch to limit intrusion of foreign objects into an inside of the electromagnetic clutch.

CITATION LIST

Patent Literature

PATENT LITERATURE 1: JP2004-293734A

SUMMARY OF INVENTION

The inventors of the present application have studied a structure that limits intrusion of foreign objects into an inside of an electromagnetic clutch that includes a flat spring and a hub.

This type of electromagnetic clutch includes: the hub that is rotated integrally with a rotatable shaft of a compressor; the flat spring that is placed on one axial side of an armature; a pulley that is rotated about an axis of the rotatable shaft by a rotational drive force outputted from the vehicle drive engine; and the armature that is rotatable about the axis. The flat spring is connected to each of the hub and the armature.

Here, when an electromagnetic coil is energized, an attractive force in a form of an electromagnetic force is exerted between the armature and the pulley, so that the armature and the pulley are coupled with each other in a state where the flat spring is resiliently deformed. In contrast, when the energization of the electromagnetic coil is stopped, the generation of the attractive force between the armature and the pulley is stopped. Thus, the resilient deformation of the flat spring is returned to its original state, and thereby the armature and the pulley are decoupled from each other.

Here, in order to generate the attractive force between the armature and the pulley by the electromagnetic coil, it is necessary to form a magnetic circuit, through which a magnetic flux passes.

Thus, the armature needs to have arcuate through-holes, which penetrate through the armature in the axial direction and extend arcuately about the axis in order to partition the magnetic flux passing region into a radially outer side and a radially inner side.

Furthermore, the flat spring has through holes, which penetrate from one end side to the other end side in the axial direction to enable and ease resilient deformation of the flat spring. Therefore, there is a possibility of that foreign objects intrude into a gap between the armature and the pulley through the through-holes of the flat spring and the through-holes of the armature. Particularly, in a case where the through-holes of the flat spring and the through-holes of the armature overlap each other, the foreign objects can easily intrude into the gap between the armature and the pulley.

The present disclosure is made in view of the above point, and it is an objective of the present disclosure to provide an electromagnetic clutch that can reduce a possibility of intrusion of foreign objects into a gap between a driven-side rotatable body, which corresponds to the armature, and a driving-side rotatable body, which corresponds to the pulley.

According to one aspect of the present disclosure, an electromagnetic clutch, which transmits a rotational drive force outputted from a drive source to a drive-subject device, includes: a driving-side rotatable body that is rotated about an axis of a rotatable shaft of the drive-subject device by the rotational drive force; a driven-side rotatable body that is placed on one side of the driving-side rotatable body in an axial direction of the axis, wherein the driven-side rotatable body is formed to be rotatable about the axis; a flat spring that is shaped into a plate form and is formed to be rotatable integrally with the rotatable shaft of the drive-subject device, wherein the flat spring is joined to the driven-side rotatable body; and a blocking member that is installed to the flat spring, wherein: the driven-side rotatable body has a primary through-hole, which is formed to extend through the driven-side rotatable body from one end side to another end side of the driven-side rotatable body in the axial direction; the flat spring has a secondary through-hole, which is formed to extend through the flat spring from one end side to another end side of the flat spring in the axial direction; switching between coupling and decoupling of the driven-side rotatable body relative to the driving-side rotatable body is made through elastic deformation of the flat spring in response to switching between generation and loss of a magnetic circuit that passes through a radially inner side of the primary through-hole in the driven-side rotatable body, the driving-side rotatable body, and a radially outer side of the primary through-hole in the driven-side rotatable body; and the blocking member closes at least a portion of the secondary through-hole.

As discussed above, at least the portion of the secondary through-hole of the flat spring is closed by the blocking member, so that the possibility of intrusion of the foreign objects into the gap between the driven-side rotatable body and the driving-side rotatable body through the secondary through-hole can be limited.

Furthermore, according to another aspect of the present disclosure, an electromagnetic clutch, which transmits a rotational drive force outputted from a drive source to a drive-subject device, includes: a hub that is rotatable integrally with a rotatable shaft of the drive-subject device; a driving-side rotatable body that is rotated about an axis of the rotatable shaft by the rotational drive force; a driven-side rotatable body that is placed on one side of the driving-side rotatable body in an axial direction of the axis, wherein the driven-side rotatable body is formed to be rotatable about the axis and includes a primary-through hole forming portion that forms a primary through-hole, which extends in the axial direction through the primary-through hole forming portion in an arcuate form about the axis; a flat spring that is placed on one side of the driven-side rotatable body in the axial direction and is respectively joined to the hub and the driven-side rotatable body, wherein the flat spring is formed to be resiliently deformable; an electromagnetic coil that forms a magnetic circuit while the magnetic circuit generates a magnetic flux, which passes through a radially inner side and a radially outer side of the primary through-hole in the driven-side rotatable body and the driving-side rotatable body, to generate an attractive force, which is an electromagnetic force, between the driving-side rotatable body and the driven-side rotatable body; and a blocking member that is placed between the flat spring and the driven-side rotatable body, wherein: when the attractive force is generated between the driving-side rotatable body and the driven-side rotatable body by the electromagnetic coil, the driving-side rotatable body and the driven-side rotatable body are coupled with each other upon resilient deformation of the flat spring; when generation of the attractive force by the electromagnetic coil is stopped, the flat spring is resiliently returned to an initial state, which is before the resilient deformation of the flat spring, and thereby the driving-side rotatable body and the driven-side rotatable body are decoupled from each other; and the blocking member closes the primary through-hole of the driven-side rotatable body.

Therefore, the blocking member closes the primary through-hole of the driven-side rotatable body, so that intrusion of foreign objects into a gap between the driven-side rotatable body and the driving-side rotatable body can be limited.

DESCRIPTION OF EMBODIMENTS

Hereinafter, embodiments will be described with reference to the drawings. In each of the following embodiments, portions, which are identical or equivalent to each other, will be indicated by the same reference signs for the sake of simplifying the description.

First Embodiment

Figure 1:
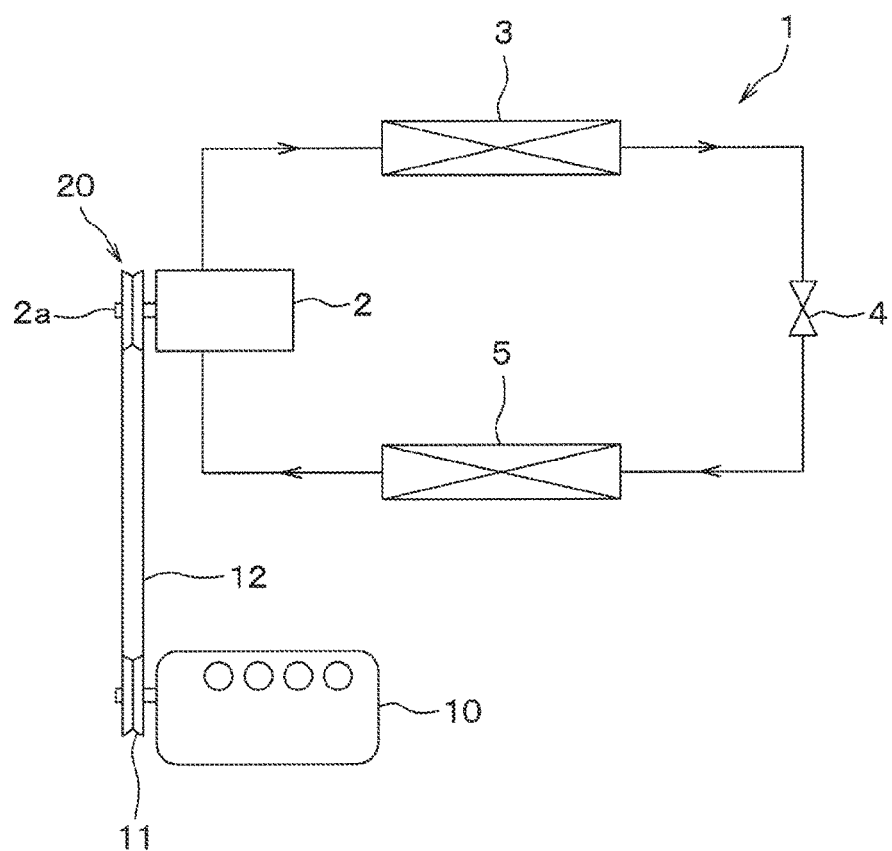
FIG. 1 is a diagram indicating an entire structure of a refrigeration cycle system according to a first embodiment.

FIG. 1 is a diagram indicating an entire structure of a refrigeration cycle system 1 of a vehicle air conditioning apparatus, in which an electromagnetic clutch 20 of the present embodiment is applied.

The refrigeration cycle system 1 includes a compressor 2, a radiator 3, an expansion valve 4 and an evaporator 5, which are connected one after another. The compressor 2 suctions refrigerant and compresses the suctioned refrigerant. The radiator 3 radiates heat from the refrigerant discharged from the compressor 2. The expansion valve 4 depressurizes and expands the refrigerant outputted from the radiator 3. The evaporator 5 evaporates the refrigerant, which is depressurized through the expansion valve 4, to absorb heat.

The compressor 2 is installed to an engine room of a vehicle. The compressor 2 suctions and compresses the refrigerant outputted from the evaporator 5 by driving a compression mechanism with a rotational drive force received from a vehicle drive engine (serving as a vehicle drive source) 10 through the electromagnetic clutch 20.

The compression mechanism may be a fixed displacement compression mechanism, which has a fixed pumping capacity, or a variable displacement compression mechanism, which is configured to vary a pumping capacity according to a control signal received from an outside.

The electromagnetic clutch 20 of the present embodiment is a clutch mechanism that is connected to the compressor 2 and has a pulley integrated thereto. The electromagnetic clutch 20 transmits the rotational drive force of the vehicle drive engine 10, which is received from an engine-side pulley 11 through a V-belt 12, to the compressor 2. The engine-side pulley 11 is connected to a rotatable drive shaft of the vehicle drive engine 10.

As will be described later, the electromagnetic clutch 20 includes a pulley 30 and an armature 40. The pulley 30 forms a driving-side rotatable body that is rotated by the rotational drive force, which is received from the vehicle drive engine 10 through the V-belt 12. The armature 40 forms a driven-side rotatable body that is connected to a rotatable shaft 2a of the compressor 2. The electromagnetic clutch 20 couples or decouples between the pulley 30 and the armature 40 to enable or disable transmission of the rotational drive force from the vehicle drive engine 10 to the compressor 2.

That is, when the pulley 30 and the armature 40 are coupled with each other at the electromagnetic clutch 20, the rotational drive force of the vehicle drive engine 10 is transmitted to the compressor 2. Thereby, the refrigeration cycle system 1 is operated. In contrast, when the pulley 30 and the armature 40 are decoupled from each other at the electromagnetic clutch 20, the rotational drive force of the vehicle drive engine 10 is not transmitted to the compressor 2. Thereby, the refrigeration cycle system 1 is not operated.

Next, details of the structure of the electromagnetic clutch 20 of the present embodiment will be described.

Figure 2:
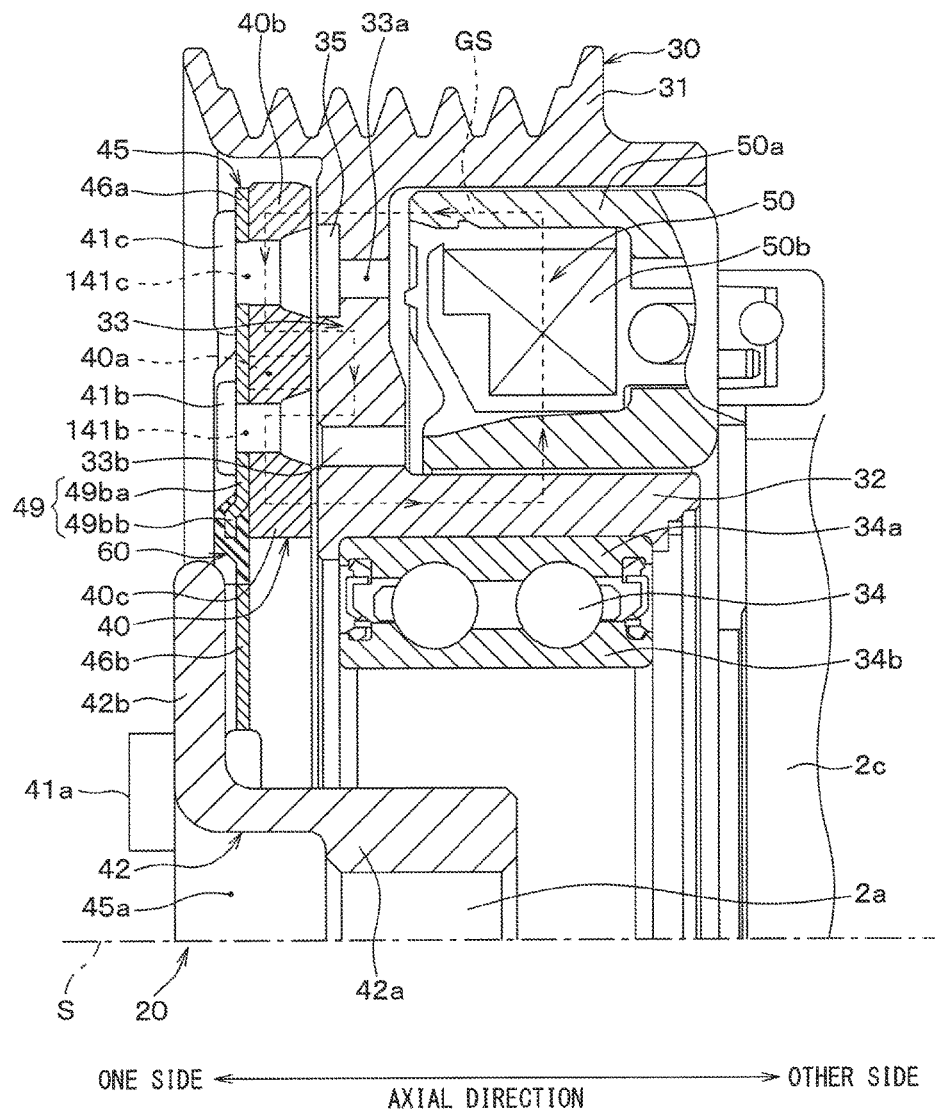
FIG. 2 is a half cross sectional view showing an upper half of an electromagnetic clutch of FIG. 1, which is located on an upper side of an axis of a rotatable shaft of the electromagnetic clutch.

FIG. 2 is an axial half cross sectional view of the electromagnetic clutch 20. This axial half cross sectional view is a cross sectional view, which includes an axis S of the rotatable shaft 2a of the compressor 2 and is taken along the axis S. The axial direction is a direction that is parallel to the axis S.

As shown in FIG. 2, the electromagnetic clutch 20 includes the pulley 30, the armature 40 and an electromagnetic coil 50.

The pulley 30 includes an outer cylindrical tubular portion 31, an inner cylindrical tubular portion 32 and an end surface portion 33

The outer cylindrical tubular portion 31 is shaped into a cylindrical tubular form that has a central axis, which coincides with the axis S of FIG. 2. A V-groove, around which a V-belt 12 is wound, is formed at an outer peripheral side of the outer cylindrical tubular portion 31. This V-groove is specifically a poly-V-groove.

An outer race 34a of a ball bearing 34 is fixed to an inner side of the inner cylindrical tubular portion 32 in a radial direction of the axis S. The ball bearing 34 supports the pulley 30 in a rotatable manner about the axis (serving as a central axis) S of the rotatable shaft 2a of the compressor 2 relative to a housing 2c, which forms an outer shell of the compressor 2. Therefore, an inner race 34b of the ball bearing 34 is fixed to the housing 2c of the compressor 2 through a fixing member, such as a snap ring.

The inner cylindrical tubular portion 32 is placed on an inner side of the outer cylindrical tubular portion 31 in the radial direction of the axis S and is shaped into a cylindrical tubular form that is centered at the axis S.

The end surface portion 33 extends in a direction (i.e., the radial direction of the axis S), which is perpendicular to the rotatable shaft 2a, such that the end surface portion 33 connects between one axial side of the outer cylindrical tubular portion 31 and one axial side of the inner cylindrical tubular portion 32. A circular through-hole is formed at a center part of the end surface portion 33 to extend through the end surface portion 33. The one side (one axial side) in the axial direction refers to a side in a direction from the armature 40 toward a flat spring 45 in the axial direction. Furthermore, the other side (other axial side) in the axial direction refers to a side in a direction from the flat spring 45 toward the armature 40 in the axial direction.

Each of the outer cylindrical tubular portion 31, the inner cylindrical tubular portion 32 and the end surface portion 33 of the present embodiment is made of a magnetic material (e.g., iron) and forms a magnetic circuit described later.

A plurality of through-holes 33a is formed between the outer cylindrical tubular portion 31 and the end surface portion 33 such that the through-holes 33a penetrate from the one end side to the other end side in the axial direction. Each of the through-holes 33a is shaped into an arcuate form that is arcuate about the axis S of the rotatable shaft 2a. The through-holes 33a are arranged one after another in the 1.5 circumferential direction about the axis S. The through-holes 33a are placed on a radially outer side of a plurality of through-holes 40a of the armature 40 shown in FIGS. 2 and 3. Although the through-holes 40a are not present in the cross section indicated in FIG. 2, a boundary of one of the through-holes 40a, which is placed on the back side of the plane of FIG. 2, is indicated by dotted lines in FIG. 2. Through-holes 33b are formed between the inner cylindrical tubular portion 32 and the end surface portion 33 such that the through-holes 33b penetrate from the one end side to the other end side in the axial direction. Each of the through-holes 33b is shaped into an arcuate form that is arcuate about the axis S of the rotatable shaft 2a. The through-holes 33b are arranged one after another in the circumferential direction about the axis S. The through-holes 33b are placed on a radially inner side of the through-holes 40a of the armature 40.

In the present embodiment, the outer cylindrical tubular portion 31, the inner cylindrical tubular portion 32 and the end surface portion 33 are formed integrally in one piece.

A surface of the end surface portion 33, which is placed on the one axial side, forms a friction surface that contacts the armature 40 when the pulley 30 and the armature 40 are coupled with each other. Therefore, in the present embodiment, a friction member 35, which increases a coefficient of friction of the end surface portion 33, is placed at a part of the end surface portion 33 located on the one axial side. The friction member 35 overlaps rivets 41c on the other axial side such that the friction member 35 overlaps one of the through-holes 33a in the axial direction. The friction member 35 is made of a non-magnetic material, such as a material including alumina fixed with resin, or sintered material made by sintering metal powder (e.g., aluminum powder).

Figure 3:
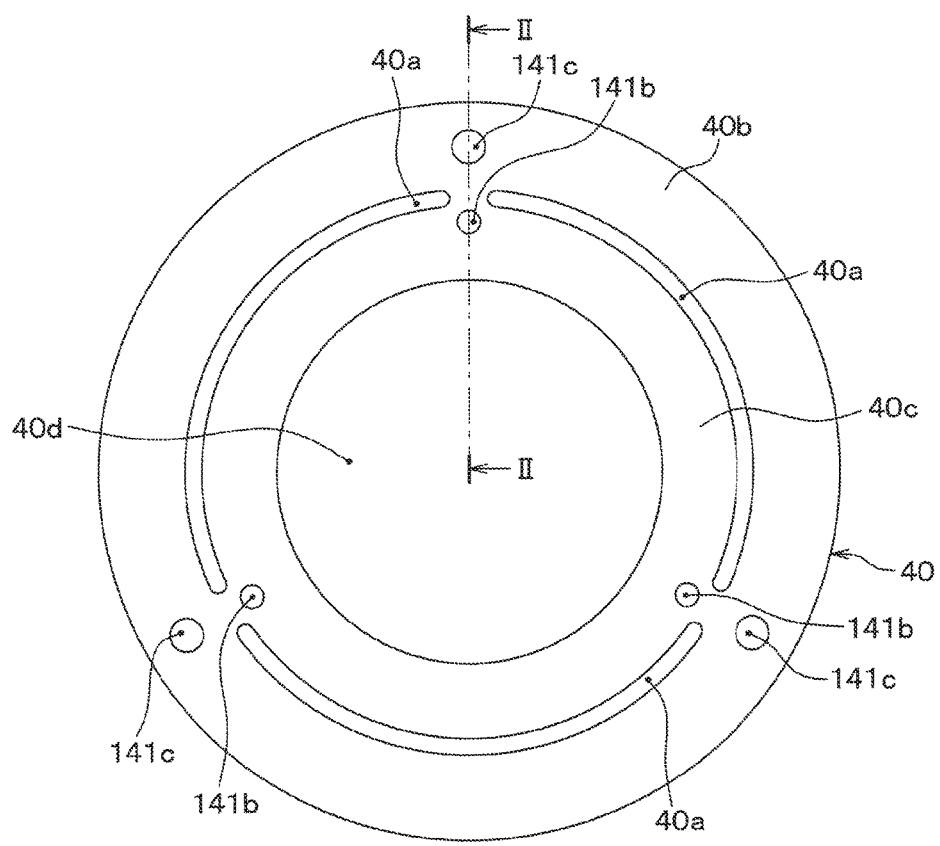
FIG. 3 is an axial view of an armature alone seen from one axial side.

The armature 40 is placed on the one axial side of the pulley 30. As shown in FIGS. 2 and 3, the armature 40 is a ring-shaped member that extends in the direction (i.e., the radial direction) perpendicular to the rotatable shaft 2a and includes a through-hole 40d that penetrates through a center part of the armature 40 from the one end side to the other end side in the axial direction. The armature 40 forms the magnetic circuit described later. A rotational center of the armature 40 of the present embodiment coincides with the central axis of the rotatable shaft 2a.

Specifically, the armature 40 includes ring members 40b, 40c, which are made of a magnetic material (e.g., iron). Each of the ring members 40b, 40c is shaped into a ring form that is centered at the axis S of the rotatable shaft 2a. The ring member 40b is placed on the radially outer side of the ring member 40c. A radially inner end portion of the ring member 40b is joined to a radially outer end portion of the ring member 40c through connections. Three through-holes 40a are formed between the ring members 40b, 40c to penetrate from one end side to the other end side in the axial direction. Specifically, the ring members 40b, 40c form primary-through hole forming portion that forms a plurality of through-holes 40a (i.e., primary through-holes). Each of the through-holes 40a is shaped into an arcuate form that is arcuate about the axis S. The through-holes 40a are arranged one after another in the circumferential direction about the axis S.

A planar surface of the armature 40, which is located on the other axial side, is opposed to the end surface portion 33 of the pulley 30 and forms a friction surface that contacts the pulley 30 when the pulley 30 and the armature 40 are coupled with each other.

The hub 42 is placed on a radially inner side of the pulley 30 and the armature 40 in the radial direction of the axis S. The hub 42 forms a connecting member that connects between the armature 40 and the rotatable shaft 2a of the compressor 2.

Specifically, the hub 42 includes a cylindrical tubular portion 42a, which extends in the axial direction, and a circular disk portion 42b, which extends toward a radially outer side from an end of the cylindrical tubular portion 42a located on the one axial side. The radially outer side refers to an outer side in the radial direction of the axis S. The circular disk portion 42b is placed on the one axial side of the pulley 30 and the armature 40. The rotatable shaft 2a of the compressor 2 is fixed to the cylindrical tubular portion 42a.

The flat spring 45, which extends in a direction perpendicular to the axis S, is placed between the hub 42 and the armature 40. The flat spring 45 is joined to the circular disk portion 42b of the hub 42 by a plurality of rivets 41a. The flat spring 45 is joined to the armature 40 by a plurality of rivets 41b, 41c. Thereby, the flat spring 45 is joined to both of the hub 42 and the armature 40. Therefore, the flat spring 45 is rotatable together with the rotatable shaft 2a.

The rivets 41b, 41c of the present embodiment are made of a magnetic material (e.g., iron). The rivets 41b are inserted into the rivet holes 141b shown in FIGS. 2 to 13. The rivets 41c are inserted into the rivet holes 141c shown in FIGS. 2 to 13.

The flat spring 45 is fixed to the hub 42, so that the flat spring 45 exerts a resilient force to the armature 40 in a direction away from the pulley 30. In the clutch off state, in which the pulley 30 and the armature 40 are decoupled from each other, a gap of a predetermined size is formed between the armature 40, which is connected to the hub 42, and the end surface portion 33 of the pulley 30 due to the resilient force of the flat spring 45.

Figure 4:
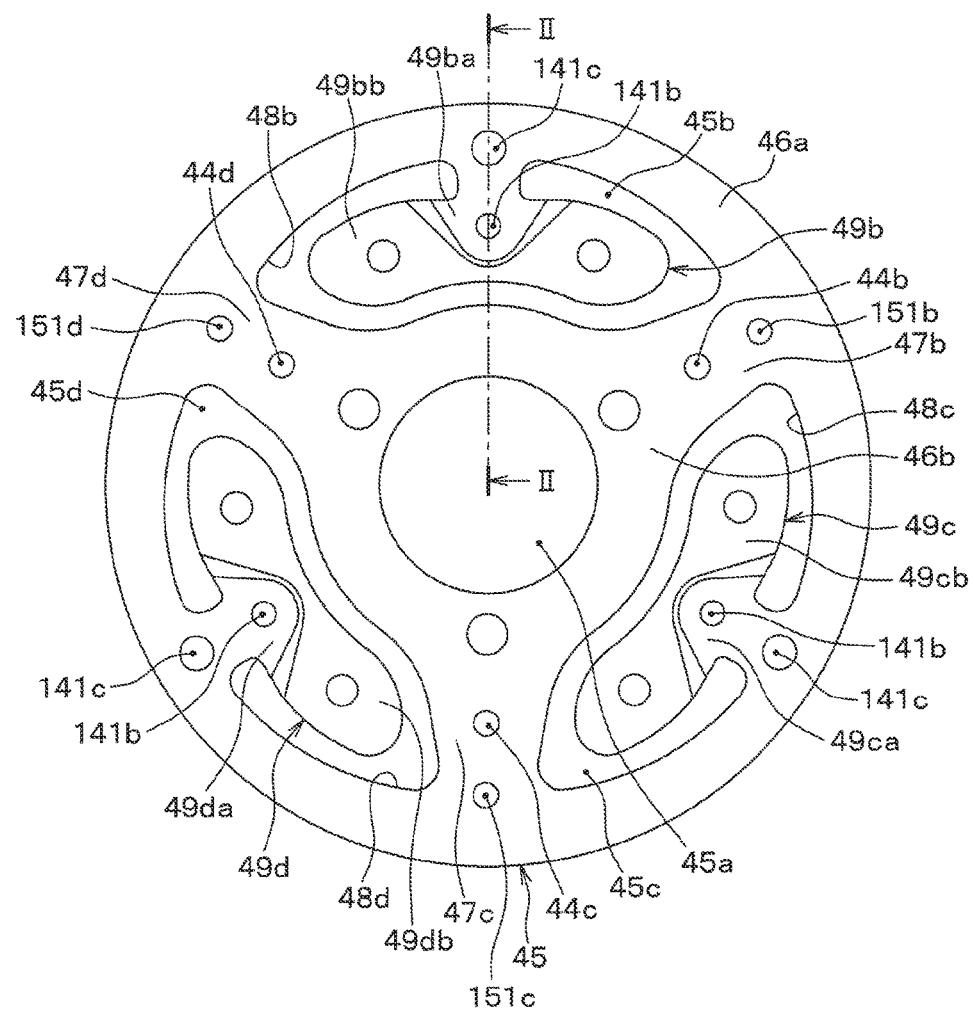
FIG. 4 is an axial view of a flat spring alone seen from the one axial side.
Figure 5:
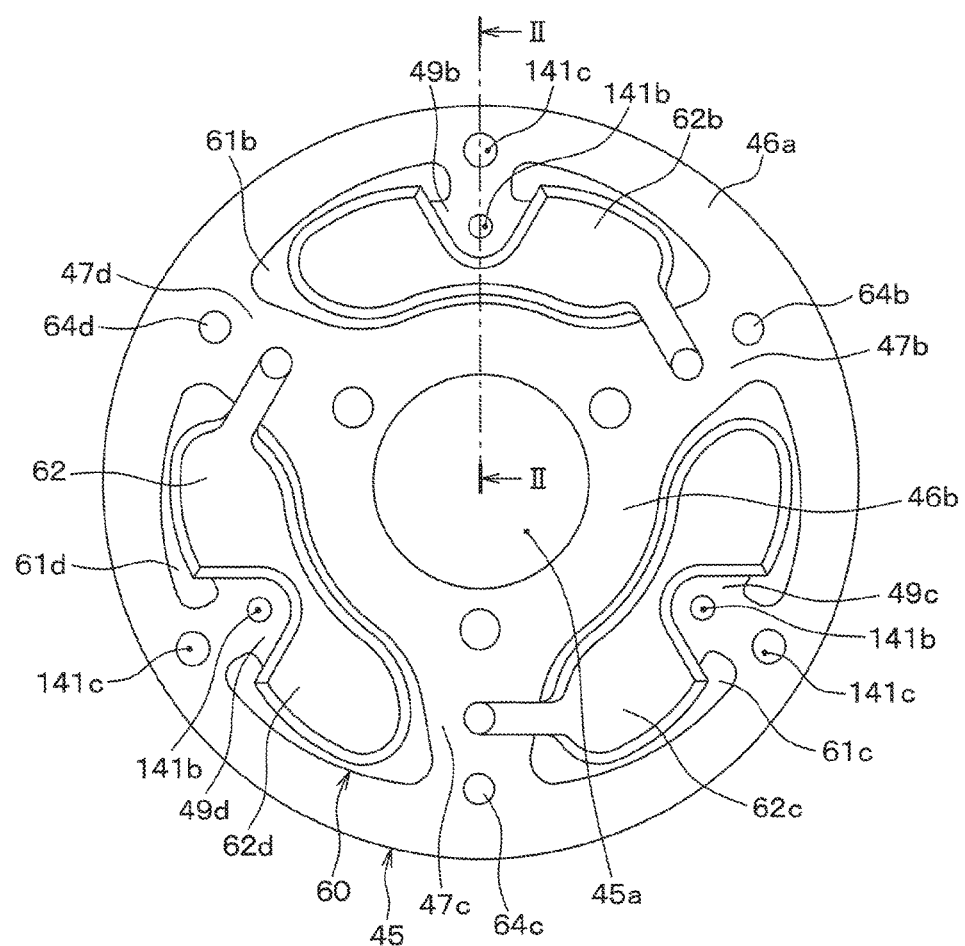
FIG. 5 is an axial view of the flat spring and the blocking member seen from the one axial side.
Figure 6:
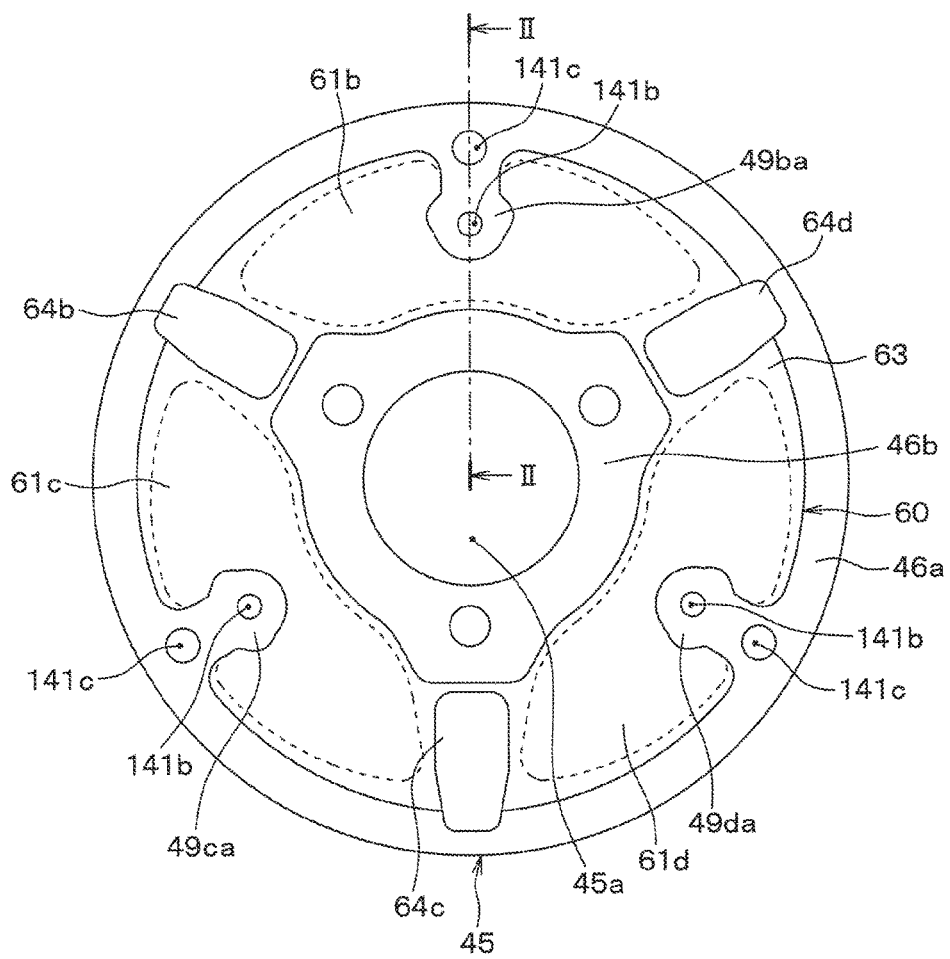
FIG. 6 is an axial view of the flat spring and a blocking member seen from the other axial side.

The flat spring 45 is a resilient member that is made of a magnetic material (e.g., iron) and is shaped into a thin plate form. As shown in FIG. 4, a through-hole 45a is formed on the inner side of the flat spring 45 in the radial direction of the axis S. As shown in FIG. 2, the cylindrical tubular portion 42a of the hub 42 extends through the through-hole 45a. FIG. 5 is an axial view of only the flat spring 45 and the blocking member 60 of the electromagnetic clutch 20 seen from the one axial side while depiction of the hub 42 is omitted. FIG. 6 is an axial view of only the flat spring 45 and the blocking member 60 of the electromagnetic clutch 20 seen from the other axial side.

As shown in FIG. 4, the flat spring 45 has through-holes 45b, 45c, 45d to enable and ease resilient deformation of the flat spring 45, The provision of the through-holes 45b, 45c, 45d in the flat spring 45 causes a reduction in the rigidity of the flat spring 45 to enable and ease the resilient deformation of the flat spring 45. Furthermore, the through-holes 40a of the armature 40 overlap the through-holes 45b, 45c, 45d of the flat spring 45.

Furthermore, three injection holes 44b, 44c, 44d are formed at three locations of the flat spring 45, at each of which a material of the blocking member 60 is injected when a component, which is formed by the flat spring 45 and the blocking member 60, is manufactured by insert molding. The injection holes 44b, 44c, 44d extend through the flat spring 45 in the axial direction. Thereby, at the time of insert molding, the material of the blocking member 60 passes through the injection holes 44b, 44c, 44d, so that the material of the blocking member 60 thoroughly spreads to both of the one axial side and the other axial side of the flat spring 45.

The through-holes 45b, 45c, 45d are placed on the radially outer side of the through-hole 45a. The through-holes 45b, 45c, 45d extend through the flat spring 45 in the axial direction. The through-holes 45b, 45c, 45d are arranged one after another in the circumferential direction about the axis S.

The flat spring 45 includes a radially outer portion 46a, a radially inner portion 46b, three bridge portions 47b, 47c, 47d, and three island portions 49b, 49c, 49d.

The radially outer portion 46a is a member, which is shaped into a generally circular ring form and is placed at a radially outermost peripheral side of the flat spring 45. The radially outer portion 46a is placed on the radially outer side of the through-holes 45b, 45c, 45d. Therefore, the radially outer portion 46a occupies a radially outer region of the flat spring 45.

The radially inner portion 46b is placed at a radially innermost peripheral side of the flat spring 45. The radially inner portion 46b is placed at a location between the through-hole 45a and the through-hole 45b, a location between the through-hole 45a and the through-hole 45c, and a location between the through-hole 45a and the through-hole 45d. The radially inner portion 46b is a member that is shaped into a generally circular ring form. Therefore, the radially inner portion 46b occupies a radially inner region of the flat spring 45.

Each of the bridge portions 47b, 47c, 47d is joined to the radially outer portion 46a at a radially outer end of the bridge portion 47b, 47c, 47d in the radial direction of the axis S and is joined to the radially inner portion 46b at a radially inner end of the bridge portion 47b, 47c, 47d in the radial direction of the axis S. The bridge portion 47b, the through-hole 45c, the bridge portion 47c, the through-hole 45d, the bridge portion 47d, and the through-hole 45b are arranged in this order in the circumferential direction about the axis S at the location between the radially outer portion 46a and the radially inner portion 46b, Therefore, each of the bridge portions 47b, 47c, 47d, which join between the radially outer portion 46a and the radially inner portion 46b, is placed between corresponding adjacent two of the through-holes 45b, 45c, 45d.

As shown in FIG. 4, each of the island portions 49b, 49c, 49d is placed at a corresponding location, which is surrounded by the corresponding through-hole 45b, 45c, 45d, and each of the island portions 49b, 49c, 49d is shaped to extend in the circumferential direction about the axis S. A circumferential center part of a radially outermost end region of each of the island portions 49b, 49c, 49d is joined to the radially outer portion 46a.

Figure 7:
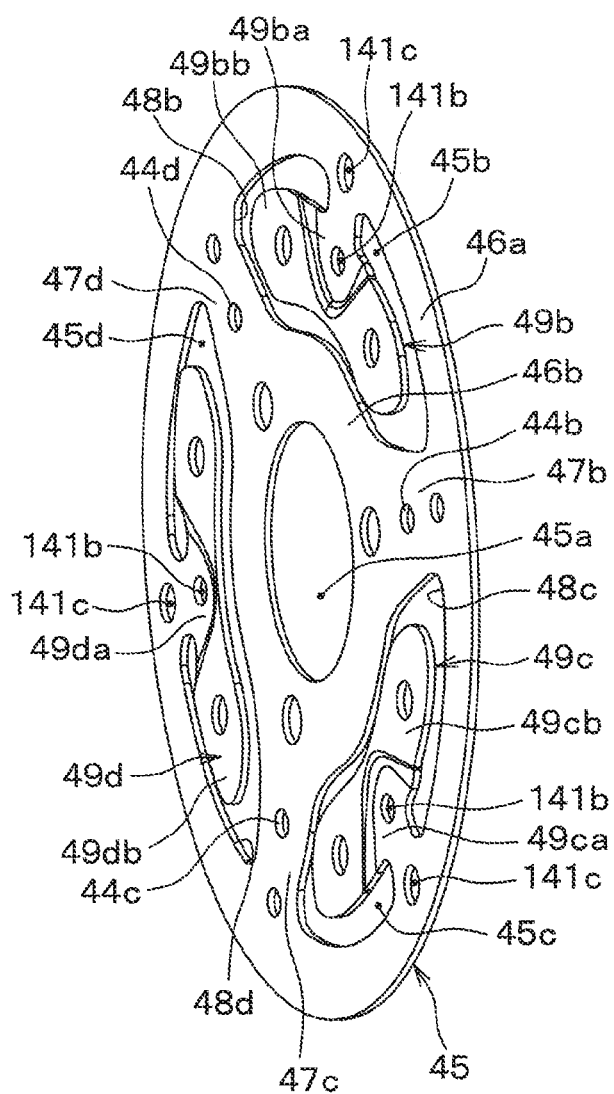
FIG. 7 is a perspective view of the flat spring alone seen from the one axial side.
Figure 8:
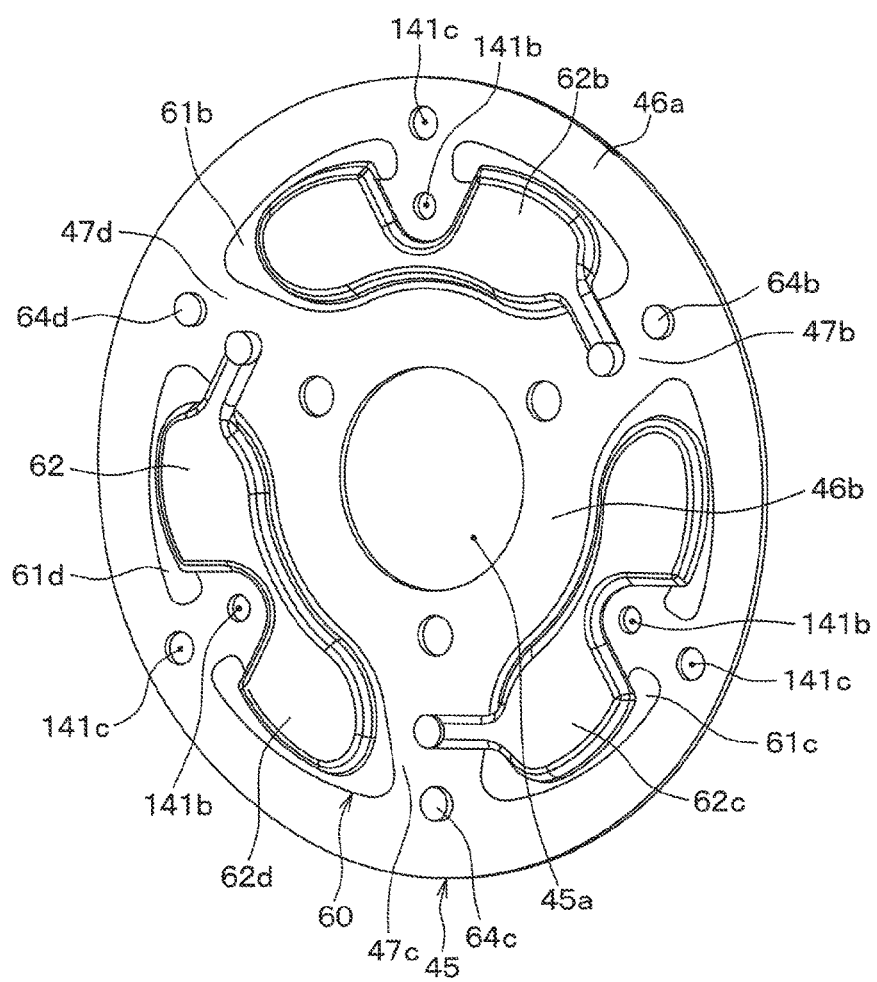
FIG. 8 is a perspective view of the flat spring and the blocking member seen from the one axial side.
Figure 9:
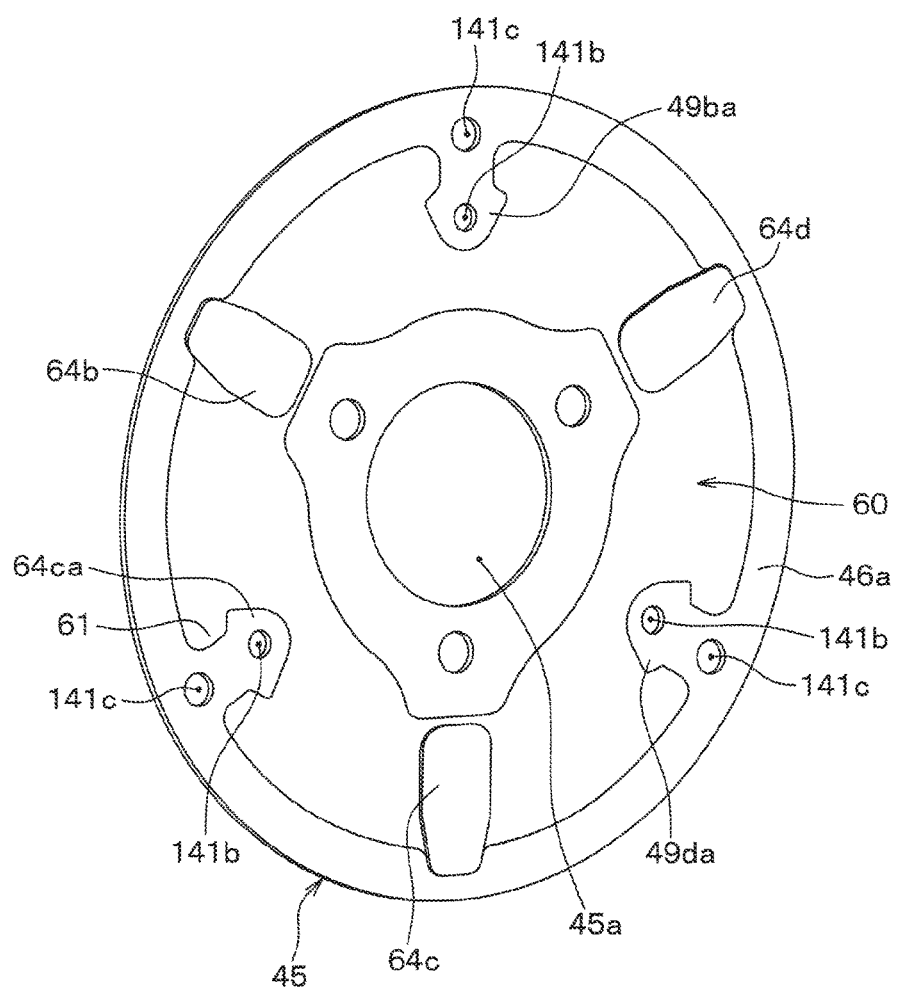
FIG. 9 is a perspective view of the flat spring and the blocking member seen from the other axial side.

Furthermore, as shown in FIGS. 2, 4 and 7, the island portion 49b includes a connecting part 49ba, which is joined to the radially outer portion 46a, and a floating part 49bb, which is joined only to the connecting part 49ba. A location of the connecting part 49ba in the axial direction is the same as a location of the radially outer portion 46a and a location of the radially inner portion 46b in the axial direction. A location of the floating part 49bb in the axial direction is displaced from the location of the connecting part 49*ba* in the axial direction toward the one axial side.

Furthermore, as shown in FIGS. 4 and 7, the island portion 49*c* includes a connecting part 49*ca*, which is joined to the radially outer portion 46*a*, and a floating part 49*cb*, which is joined only to the connecting part 49*ca*. A location of the connecting part 49*ca* in the axial direction is the same as the location of the radially outer portion 46*a* and the location of the radially inner portion 46*b* in the axial direction. A location of the floating part 49*cb* in the axial direction is displaced from the location of the connecting part 49*ca* in the axial direction toward the one axial side.

Furthermore, as shown in FIGS. 4 and 7, the island portion 49*d* includes a connecting part 49*da*, which is joined to the radially outer portion 46*a*, and a floating part 49*db*, which is joined only to the connecting part 49*da*. A location of the connecting part 49*da* in the axial direction is the same as the location of the radially outer portion 46*a* and the location of the radially inner portion 46*b* in the axial direction. A location of the floating part 49*db* in the axial direction is displaced from the location of the connecting part 49*da* in the axial direction toward the one axial side.

As discussed above, each of the island portions 49*b*, 49*c*, 49*d* is cantilevered by the radially outer portion 46*a*. The through-hole 45*b* is surrounded by the radially outer portion 46*a* and the island portion 49*b*. The through-hole 45*c* is surrounded by the radially outer portion 46*a* and the island portion 49*c*. The through-hole 45*d* is surrounded by the radially outer portion 46*a* and the island portion 49*d*.

In the present embodiment, the flat spring 45 and the armature 40 are formed such that the through-holes 40*a* of the armature 40 overlap the through-holes 45*b*, 45*c*, 45*d* of the flat spring 45 in the axial direction.

As shown in FIGS. 2, 5, 6, 8 and 9, the blocking member 60, which covers the through-holes 45*b*, 45*c*, 45*d*, is installed to the flat spring 45. The blocking member 60 reduces a shock that is generated at the time of coupling between the armature 40 and the pulley 30. Furthermore, the blocking member 60 limits intrusion of a foreign object into a gap between the armature 40 and the pulley 30. As shown in FIGS. 5, 6, 8, 9, 10, 11 and 12, the blocking member 60 includes sub-blocking members 61*b*, 61*c*, 61*d*, 62*b*, 62*c*, 62*d*, 63, 64*b*, 64*c*, 64*d*.

The sub-blocking members 61*b*, 61*c*, 61*d* are also referred to as main blocking portions 61*b*, 61*c*, 61*d*. The sub-blocking members 62*b*, 62*c*, 62*d* are also referred to as float cover portions 62*b*, 62*c*, 62*d*. The sub-blocking member 63 is also referred to as a flange portion 63. The sub-blocking members 64*b*, 64*c*, 64*d* are also referred to as armature-side thick wall portions 64*b*, 64*c*, 64*d*.

Figure 10:
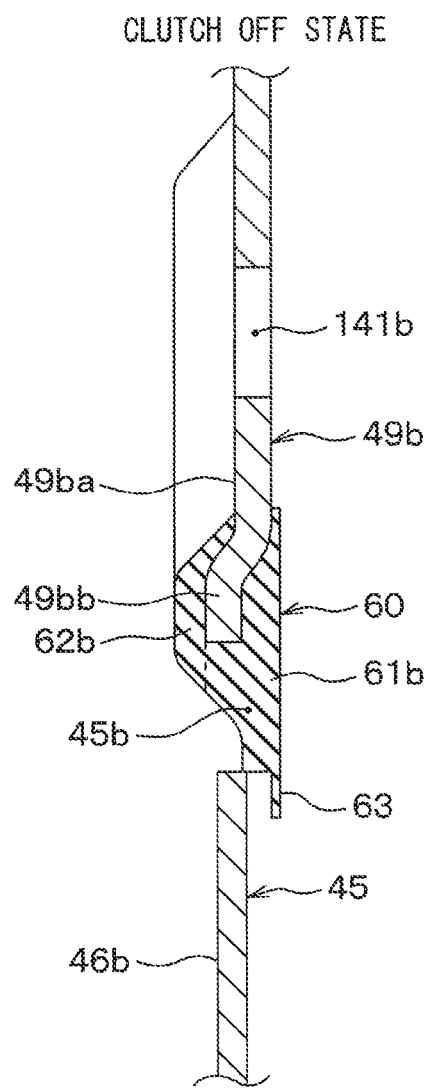
FIG. 10 is an enlarged cross-sectional view showing the blocking member at a clutch off time.
Figure 11:
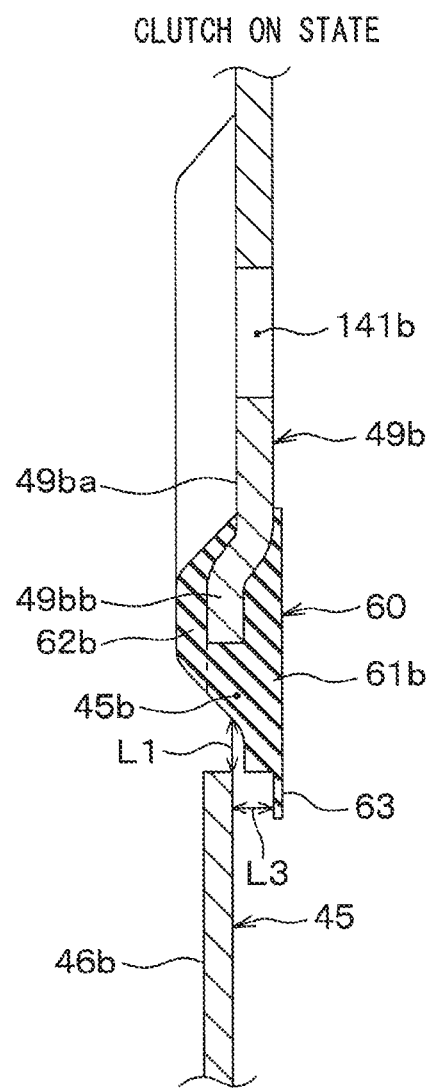
FIG. 11 is an enlarged cross-sectional view showing the blocking member at a clutch on state.
Figure 12:
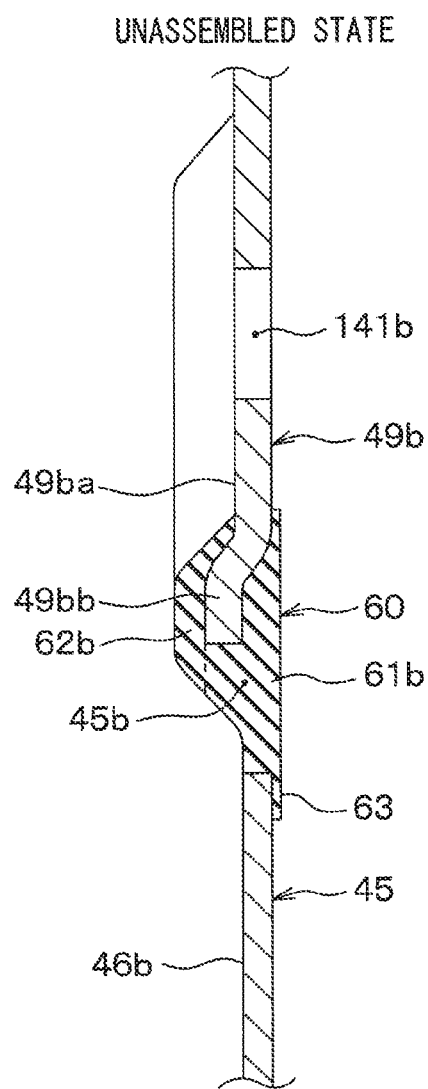
FIG. 12 is an enlarged cross-sectional view showing the blocking member at an unassembled state.

FIG. 10 is an enlarged cross-sectional view showing the blocking member 60 of FIG. 2 and its adjacent area at a clutch off state. FIG. 11 is an enlarged cross-sectional view showing the same portion as that of FIG. 10 at a clutch on state. FIG. 12 is an enlarged cross-sectional view showing the same portion of the flat spring 45 and the blocking member 60 as that of FIG. 10 in an unassembled state. The unassembled state refers to a state, in which the flat spring 45 and the blocking member 60 are assembled together while the flat spring 45 and the blocking member 60 are not assembled to the other portion of the electromagnetic clutch 20. In FIGS. 10, 11 and 12, a boundary between the main blocking portion 61*b* and the float cover portion 62*b* is indicated by a dotted line.

Each of the main blocking portions 61*b*, 61*c*, 61*d* is a member that is in a thin film form. A part of the main blocking portion 61*b* is placed in the through-hole 45*b* and closes the through-hole 45*b*. Furthermore, another part of the main blocking portion 61*b* is placed between the floating part 49*bb* and the armature 40 and entirely covers the floating part 49*bb* from the other axial side. The other part of the main blocking portion 61*b* is pressed by the floating part 49*bb* and the armature 40 and is thereby compressed.

A part of the main blocking portion 61*c* is placed in the through-hole 45*c* and closes the through-hole 45*c*. Furthermore, another part of the main blocking portion 61*c* is placed between the floating part 49*cb* and the armature 40 and entirely covers the floating part 49*cb* from the other axial side. The other part of the main blocking portion 61*c* is pressed by the floating part 49*cb* and the armature 40 and is thereby compressed.

A part of the main blocking portion 61*d* is placed in the through-hole 45*d* and closes the through-hole 45*d*. Furthermore, another part of the main blocking portion 61*d* is placed between the floating part 49*db* and the armature 40 and entirely covers the floating part 49*db* from the other axial side. The other part of the main blocking portion 61*d* is pressed by the floating part 49*db* and the armature 40 and is thereby compressed.

The float cover portion 62*b* is a constituent member of the blocking member 60, which is placed on the one axial side of the floating part 49*bb*. The float cover portion 62*b* is joined to a surface of the main blocking portion 61*b*, which is located on the one axial side, and the float cover portion 62*b* projects from this surface of the main blocking portion 61*b* toward the one axial side. The float cover portion 62*b* entirely covers the floating part 49*bb* from the one axial side. Furthermore, as shown in FIG. 5, the float cover portion 62*b* extends from a location, at which the float cover portion 62*b* covers the island portion 49*b*, to the inside of the injection hole 44*b* along the one axial side of the bridge portion 47*b*, and the float cover portion 62*b* is joined to the armature-side thick wall portion 64*b* at the opening of the injection hole 44*b* on the other axial side.

The float cover portion 62*c* is a constituent member of the blocking member 60, which is placed on the one axial side of the floating part 49*cb*. The float cover portion 62*c* is joined to a surface of the main blocking portion 61*c*, which is located on the one axial side, and the float cover portion 62*c* projects from this surface of the main blocking portion 61*c* toward the one axial side. The float cover portion 62*c* entirely covers the floating part 49*cb* from the one axial side. Furthermore, as shown in FIG. 5, the float cover portion 62*c* extends from a location, at which the float cover portion 62*c* covers the island portion 49*c*, to the inside of the injection hole 44*c* along the one axial side of the bridge portion 47*c*, and the float cover portion 62*c* is joined to the armature-side thick wall portion 64*c* at the opening of the injection hole 44*c* on the other axial side.

The float cover portion 62*d* is a constituent member of the blocking member 60, which is placed on the one axial side of the floating part 49*db*. The float cover portion 62*d* is joined to a surface of the main blocking portion 61*d*, which is located on the one axial side, and the float cover portion 62*d* projects from this surface of the main blocking portion 61*d* toward the one axial side. The float cover portion 62*d* entirely covers the floating part 49*db* from the one axial side. Furthermore, as shown in FIG. 5, the float cover portion 62*d* extends from a location, at which the float cover portion 62*d* covers the island portion 49*d*, to the inside of the injection hole 44*d* along the one axial side of the bridge portion 47*d*, and the float cover portion 62*d* is joined to the armature-side thick wall portion 64*d* at the opening of the injection hole 44*d* on the other axial side.

As discussed above, the floating part 49*bb* is clamped from the one axial side and the other axial side by the main blocking portion 61*b* and the float cover portion 62*b*. Furthermore, the floating part 49*cb* is clamped from the one axial side and the other axial side by the main blocking portion 61*c* and the float cover portion 62*c*. Also, the floating part 49*db* is clamped from the one axial side and the other axial side by the main blocking portion 61*d* and the float cover portion 62*d*. With the above construction, at the time of shifting from the clutch off state to the clutch on state, the vibration damping performance of the blocking member 60 is improved.

As shown in FIGS. 6, 9, 10, 11 and 12, the flange portion 63 projects from an outer peripheral end part of each of the main blocking portions 61*b*, 61*c*, 61*d* in a crossing direction that crosses the axial direction at a right angle. The flange portion 63 is shaped into a thin film form. A maximum axial thickness of the flange portion 63 measured in the axial direction is smaller than an average axial thickness of any of the sub-blocking members 61*b*, 61*c*, 61*d*, 62*b*, 62*c*, 62*d*, 64*b*, 64*c*, 64*d* measured in the axial direction. Therefore, the flange portion 63 side end part of each main blocking portion 61*b*, 61*c*, 61*d* and the flange portion 63, which is joined to the flange 63 portion side end part of the main blocking portion 61*b*, 61*c*, 61*d*, form a shape that is stepped.

As shown in FIGS. 6, 9, 10, 11 and 12, each of three peripheral edge parts (i.e., secondary through-hole forming parts) of the radially inner portion 46*b* of the flat spring 45 bounds and forms a corresponding one of the through-holes 45*b*, 45*c*, 45*d* (i.e., the primary through-holes), and the flange portion 63 entirely covers each of these peripheral edge parts of the radially inner portion 46*b* of the flat spring 45 from the other axial side. That is, the flange portion 63 is placed between the flat spring 45 and the armature 40 and overlaps the peripheral edge parts of the flat spring 45 in the axial direction. Each of the peripheral edge parts of the flat spring 45 described above is formed as a through-hole 45*b*, 45*c*, 45*d* side end part of the radially inner portion 46*b*.

Furthermore, each of three peripheral edge parts (i.e., secondary through-hole forming parts) of the radially outer portion 46*a* of the flat spring 45 bounds and forms a corresponding one of the through-holes 45*b*, 45*c*, 45*d*, and the flange portion 63 entirely covers each of these peripheral edge parts of the radially outer portion 46*a* of the flat spring 45 from the other axial side. Furthermore, the flange portion 63 cooperates with the armature-side thick wall portions 64*b*, 64*c*, 64*d* to entirely cover the bridge portions 47*b*, 47*c*, 47*d* of the flat spring 45 from the other axial side. That is, the flange portion 63 is placed between the flat spring 45 and the armature 40 and overlaps the peripheral edge parts of the flat spring 45 in the axial direction. Each of the peripheral edge parts discussed above is formed as a through-hole 45*b*, 45*c*, 45*d* side end part of the radially outer portion 46*a*.

Therefore, the part of the flange portion 63, which covers the other axial side of the flat spring 45, is urged and is compressed by the flat spring 45 and the armature 40. FIG. 6 shows dotted lines, each of which indicates a boundary between the corresponding main blocking portion 61*b*, 61*c*, 61*d* and the flange portion 63, for the sake of easy understanding.

Furthermore, because of the above described construction, a peripheral edge part (i.e., a secondary through-hole forming part) of each of the bridge portions 47*b*, 47*c*, 47*d* of the flat spring 45, which forms the corresponding through-hole 45*b*, 45*c*, 45*d*, is covered by the flange portion 63 from the other axial side. That is, these peripheral edge parts of the bridge portions 47*b*, 47*c*, 47*d* entirely overlap the flange portion 63 in the axial direction. FIGS. 10, 11 and 12 show a state where the flange portion 63 overlaps the peripheral edge part of the radially inner portion 46*b* of the flat spring 45, which forms the through-hole 45*b*.

Each of the armature-side thick wall portions 64*b*, 64*c*, 64*d* is placed on the other axial side of the corresponding bridge portion 47*b*, 47*c*, 47*d* and is joined to the flange portion 63 at an end part of the armature-side thick wall portion 64*b*, 64*c*, 64*d* in a direction perpendicular to the axial direction. Each of the armature-side thick wall portions 64*b*, 64*c*, 64*d* is joined to the corresponding main blocking portion 61*b*, 61*c*, 61*d* through the corresponding injection hole 44*b*, 44*c*, 44*d*.

An average axial thickness of the armature-side thick wall portions 64*b*, 64*c*, 64*d* is larger than the maximum axial thickness of the flange portion 63. Therefore, the armature-side thick wall portions 64*b*, 64*c*, 64*d* project from the flange portion 63 toward the other axial side. Because of this construction, in the state where the flat spring 45 is fixed to the armature 40 by the rivets 41*b*, 41*c*, the flat spring 45 is flexed in a wave form in the axial direction along the circumferential direction about the axis S.

Specifically, contact portions of the flat spring 45, which respectively contact the armature-side thick wall portions 64*b*, 64*c*, 64*d*, are flexed in a direction away from the armature 40, and the other portions of the flat spring 45, which are other than the contact portions of the flat spring 45, are flexed in a direction toward the armature 40. When the flat spring 45 is flexed in the above-described manner, the rigidity of the flat spring 45 at the clutch off time is increased, thereby implementing the improved robustness against external vibrations at the clutch off time.

Furthermore, the armature-side thick wall portions 64*b*, 64*c*, 64*d* are respectively inserted into the holes 151*b*, 161*c*, 151*d* of the flat spring 45. Thereby, it is possible to reduce a possibility of removal of the armature-side thick wall portions 64*b*, 64*c*, 64*d* from the flat spring 45.

Figure 13:
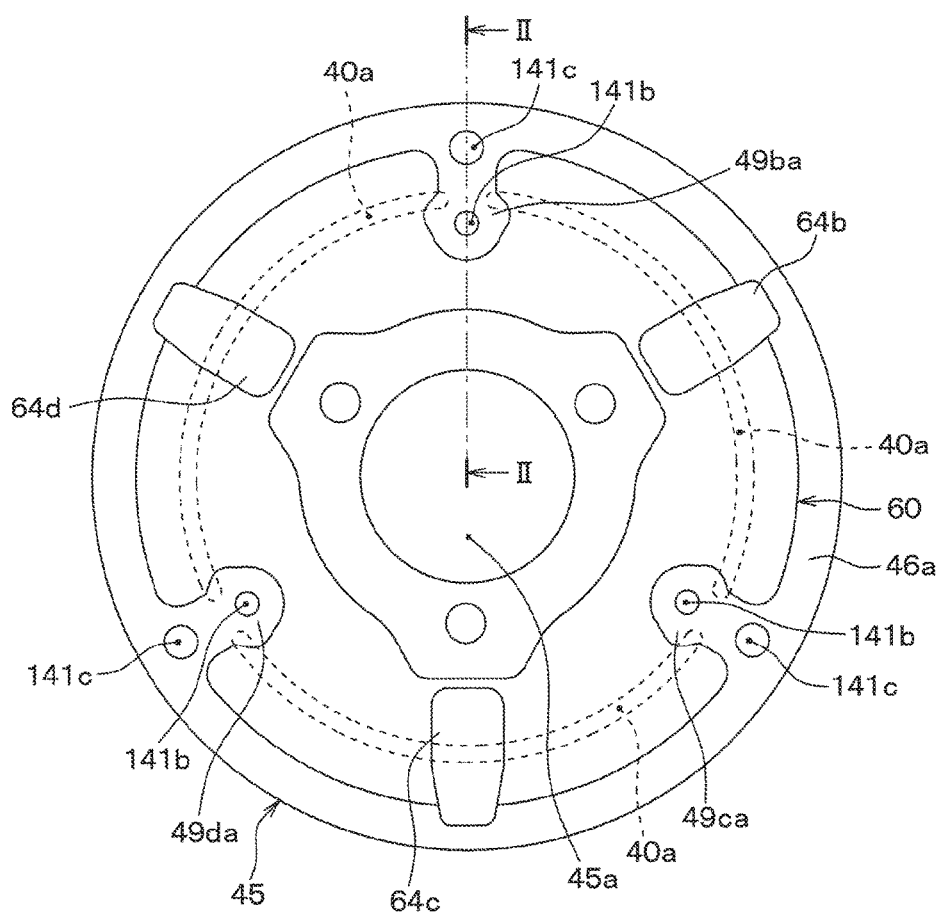
FIG. 13 is a view of the flat spring and the blocking member, onto which through-holes of the armature are projected.

Furthermore, with reference to FIG. 13, the sub-blocking members 61*b*, 61*c*, 61*d*, 63, 64*b*, 64*c*, 64*d* respectively cover corresponding portions of the through-holes 40*a* of the armature 40 from the one axial side. In FIG. 13, figures, which are formed by axially projecting peripheral edges of the through-holes 40*a* of the armature 40 onto a diagram that is the same as FIG. 6, are respectively indicated by dotted lines. Therefore, even when foreign objects enter the gap between the flat spring 45 and the armature 40, a possibility of intrusion of the foreign objects into the through-holes 40*a* is reduced.

The blocking member 60 of the present embodiment is made of a rubber material, which serves as an elastic material that is elastically deformable. Specifically, the blocking member 60 is made of EPDM. EPDM stands for Ethylene Propylene Rubber.

The blocking member 60 of the present embodiment is a member that is formed by molding the sub-blocking members 61*b*, 61*c*, 61*d*, 62*b*, 62*c*, 62*d*, 63, 64*b*, 64*c*, 64*d* as a one piece body from the common rubber material. That is, the sub-blocking members 61*b*, 61*c*, 61*d*, 62*b*, 62*c*, 62*d*, 63, 64*b*, 64*c*, 64*d* form the blocking member 60 as the one piece component that is molded integrally.

The armature 40, the hub 42, the flat spring 45, the blocking member 60 and the rotatable shaft 2*a* of the compressor 2 are fixed relative to each other in the above described manner. When the pulley 30 and the armature 40 are coupled with each other, the pulley 30, the armature 40, the hub 42, the flat spring 45 and the rotatable shaft 2*a* of the compressor 2 are rotated about the central axis.

The electromagnetic coil 50 includes a core 50*a* and a coil portion 50*b*. The core 50*a* is made of a magnetic material (e.g., iron) and is shaped into a ring form that is centered at the axis S of the rotatable shaft 2*a* of the compressor 2. The coil portion 50*b* is placed at the inside of the core 50*a*. The coil portion 50*b* is formed by winding a coil wire made of, for example, copper or aluminum around a spool made of, for example, resin to form a plurality of rows and a plurality of layers of the coil wire around the spool.

Next, an operation of the electromagnetic clutch 20 of the present embodiment will be described.

First of all, the clutch on state will be described. When the electromagnetic coil 50 is energized, a magnetic flux, which is generated from the electromagnetic coil 50, flows through the outer cylindrical tubular portion 31 of the pulley 30, the ring member 40*b* of the armature 40, the end surface portion 33 of the pulley 30, the ring member 40*c* of the armature 40, the inner cylindrical tubular portion 32 of the pulley 30 and the electromagnetic coil 50 in this order, as indicated by an arrow GS. Thereby, a magnetic circuit, which is indicated by the arrow GS, is formed.

In this way, an attractive force is exerted between the pulley 30 and the armature 40, and thereby the flat spring 45 is resiliently deformed. At this time, the blocking member 60 is resiliently deformed together with the flat spring 45 in the state where the blocking member 60 is held by the flat spring 45. In this state, the pulley 30 and the armature 40 are engaged with each other and are thereby coupled together. Thus, a rotational drive force, which is generated from the vehicle drive engine 10, is transmitted through the engine-side pulley 11, the V-belt 12, the pulley 30, the armature 40, the flat spring 45, the hub 42, and the rotatable shaft 2*a* of the compressor 2 in this order. This state is referred to as the clutch on state.

Next, the clutch off state will be described. When the energization of the electromagnetic coil 50 is stopped, the magnetic circuit described above is lost. Therefore, the attractive force is lost between the pulley 30 and the armature 40. Thus, the resilient deformation of the flat spring 45 is returned to its original state. At this time, in the state where the blocking member 60 is held by the flat spring 45, resilient deformation of the blocking member 60 is returned to its original state along with the flat spring 45. In this way, the armature 40 is separated from the pulley 30. Thus, the transmission of the rotational drive force from the vehicle drive engine 10 to the rotatable shaft 2*a* of the compressor 2 is stopped. This state is referred to as the clutch off state.

In the clutch off state, unlike the unassembled state, the flat spring 45 is flexed in the wave form in the axial direction along the circumferential direction about the axis S, as discussed above. In this way, the flange portion 63, which was in contact with the surface of the radially inner portion 46*b* of the flat spring 45 located on the other axial side in the unassembled state of FIG. 12, is spaced from the radially inner portion 46*b* toward the other axial side, as shown in FIG. 10.

Therefore, the surface of the part of each of the main blocking portions 61*b*, 61*c*, 61*d*, which have been opposed to and have been in contact with the outer peripheral end part of the radially inner portion 46*b*, is displaced relative to the outer peripheral end part of the radially inner portion 46*b* toward the other axial side in the clutch off state, as exemplified in FIG. 10. At this time, in the case of the example shown in FIG. 10, a segment of the inner peripheral end part of the main blocking portion 61*b* contacts the outer peripheral end part of the radially inner portion 46*b*. However, depending on the location and the situation, a gap may possibly be formed between the inner peripheral end part of the main blocking portion 61*b* and the outer peripheral end part of the radially inner portion 46*b*.

Furthermore, in the clutch on state, the amount of resilient deformation of the flat spring 45 is increased in comparison to the amount of resilient deformation of the flat spring 45 in the clutch off state. Therefore, a possibility of forming a gap between the inner peripheral end part of the main blocking portion 61*b* and the outer peripheral end part of the radially inner portion 46*b* shown in FIG. 11 is further increased.

Even in the case where such a gap is formed, due to presence of the flange portion 63, which covers the outer peripheral end part of the radially inner portion 46*b* from the other axial side, the gap forms a labyrinth structure. Therefore, even when a foreign object intrudes from this gap to a location between the flat spring 45 and the armature 40, a possibility of further intrusion of the foreign object into the through-hole 40*a* of the armature 40 beyond the flange portion 63 is reduced.

According to the present embodiment discussed above, the electromagnetic clutch 20 includes: the hub 42, which is rotated integrally with the compressor 2; the pulley 30, which is rotated about the axis S of the rotatable shaft 2*a* by the rotational drive force; and the armature 40. The armature 40 is placed on the one axial side of the pulley 30 and is configured to be rotatable about the axis S of the rotatable shaft 2*a*. Furthermore, the armature 40 includes the through-holes 40*a*, each of which circumferentially extends in the arcuate form about the axis S and penetrates through the armature 40 from the one end side to the other end side of the armature 40 in the axial direction. The flat spring 45 is connected to the hub 42 and is connected to the armature 40. The flat spring 45 has the through-holes 45*b*, 45*c*, 45*d*, which penetrate through the flat spring 45 from the one end side to the other end side of the flat spring 45 in the axial direction, and the flat spring 45 is configured to be resiliently easily deformable.

The through-holes 40*a* of the armature 40 overlap the through-holes 45*b*, 45*c*, 45*d* of the flat spring 45 in the axial direction.

The electromagnetic coil 50 generates the magnetic flux, which passes through the ring members 40*b*, 40*c* of the armature 40, the outer cylindrical tubular portion 31, the inner cylindrical tubular portion 32 and the end surface portion 33 of the pulley 30, as indicated by the arrow GS. In this way, the magnetic circuit, which generates the attractive force in the form of the electromagnetic force between the armature 40 and the pulley 30, is formed. When the electromagnetic coil 50 is energized, the attractive force in the form of the electromagnetic force is generated between the armature 40 and the pulley 30. Thereby, the armature 40 and the pulley 30 are coupled with each other while the flat spring 45 and the blocking member 60 are resiliently deformed. When the energization of the electromagnetic coil 50 is stopped, the generation of the attractive force between the armature 40 and the pulley 30 is stopped, so that the resilient deformation of the flat spring 45 is returned to its original state. In response to this, the resilient deformation of the blocking member 60 is returned to its original state. Thereby, the armature 40 and the pulley 30 are decoupled from each other.

The corresponding parts of the blocking member 60 are placed between the flat spring 45 and the armature 40, as discussed above. Specifically, the part of each of the main blocking portions 61*b*, 61*c*, 61*d*, the whole of the flange portion 63, and the whole of each of the armature-side thick wall portions 64b, 64c, 64d are placed between the flat spring 45 and the armature 40. Therefore, the blocking member 60 can fill the gap between the flat spring 45 and the armature 40. In addition to this, each of the main blocking portions 61b, 61c, 61d is formed to close the corresponding one of the through-holes 45a, 45b, 45c. Therefore, intrusion of the foreign object between the armature 40 and the pulley 30 can be limited.

Furthermore, the flange portion 63 is formed to cover the peripheral edge parts (i.e., the secondary through-hole forming parts) of the flat spring 45, which form the through-holes 45b, 45c, 45d, from the other axial side. Therefore, even when the main blocking portions 61b, 61c, 61d are deformed and shrunk due to secular change, the main blocking portions 61b, 61c, 61d can block the through-holes 45b, 45c, 45d in corporation with the main blocking portions 61b, 61c, 61d. Thus, it is possible to more reliably limit the intrusion of the foreign object between the armature 40 and the pulley 30.

As discussed above, when the main blocking portions 61b, 61c, 61d and the flange portion 63, which close the through-holes 45a, 45b, 45c, are formed from the 1.5 common material and are formed as the single component, the number of the components can be reduced. In this way, it is possible to limit the intrusion of the foreign object into the inside of the electromagnetic clutch 20 through the through-holes 45a, 45b, 45c and the through-holes 40a.

Furthermore, the flange portion 63 is placed between the flat spring 45 and the armature 40. In addition to this, the thickness of the flange portion 63 measured in the axial direction is reduced in comparison to the thickness of the radially inner end of the main blocking portion 61b measured in the axial direction. Here, the rivets 41b are placed on the one axial side at the radially outer side of the main blocking portions 61b, 61c, 61d. Therefore, the coupling force of the armature 40 can be stabilized by limiting the reduction of the fixing force exerted by the rivets 41b.

As shown in FIG. 11, in the clutch on state, a distance L3 is shorter than a distance L1. Here, the distance L3 is a shortest distance measured in the axial direction from the end part (i.e., the outer peripheral end part) of the radially inner portion 46b, which is located on the through-hole 45b side, to the flange portion 63 in the clutch on state.

Second Embodiment

Next, a second embodiment will be described. The electromagnetic clutch 20 of the present embodiment is modified relative to the electromagnetic clutch 20 of the first embodiment such that the blocking member 60 is replaced with a blocking member 70. The components, which are indicated by the same reference signs in both of the present embodiment and the first embodiment, are substantially equivalent members and thereby will not be described further for the sake of simplicity.

The electromagnetic clutch 20 of the present embodiment is applied to the refrigeration cycle system 1 of the vehicle air conditioning apparatus, which is similar to that of the first embodiment.

Figure 14:
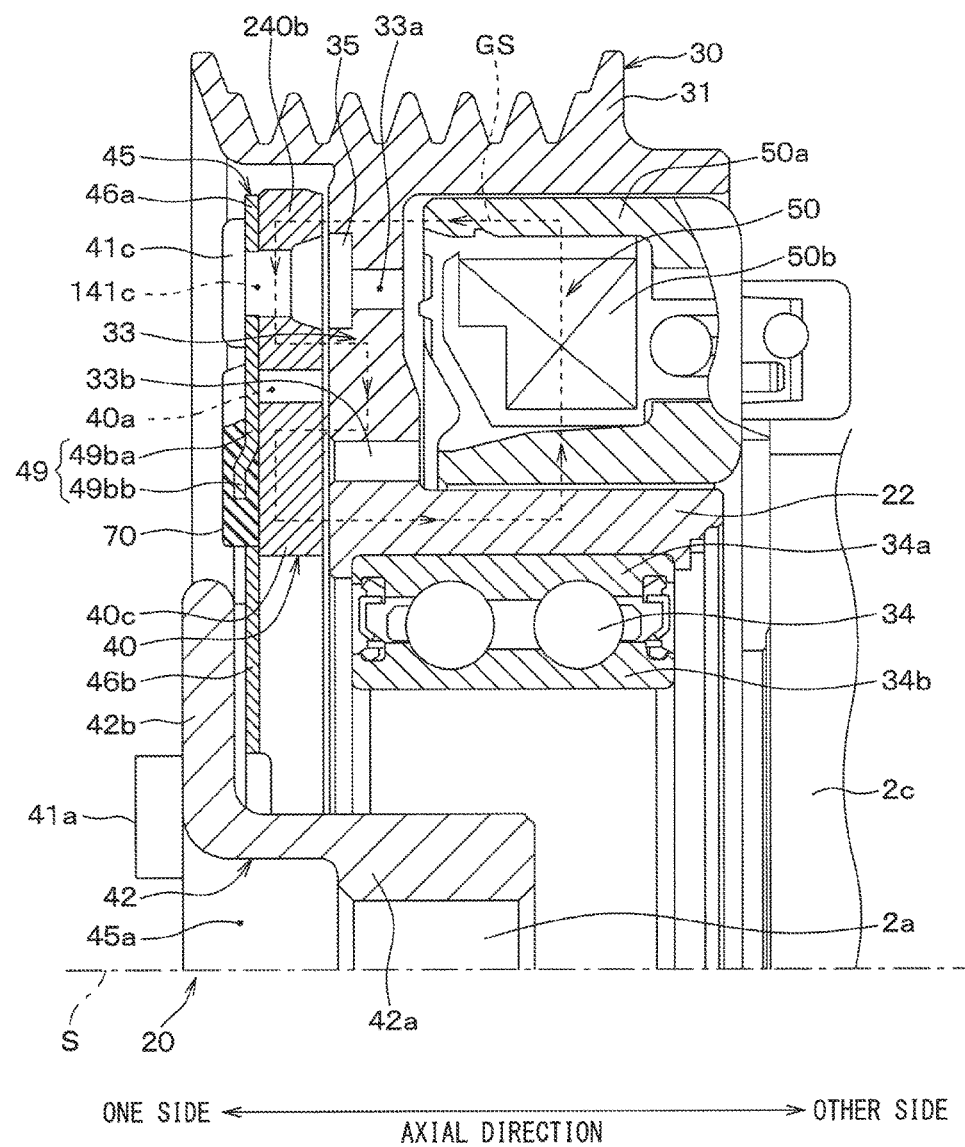
FIG. 14 is a half cross sectional view showing an upper half of an electromagnetic clutch of a second embodiment, which is located on an upper side of an axis of a rotatable shaft of the electromagnetic clutch.
Figure 15:
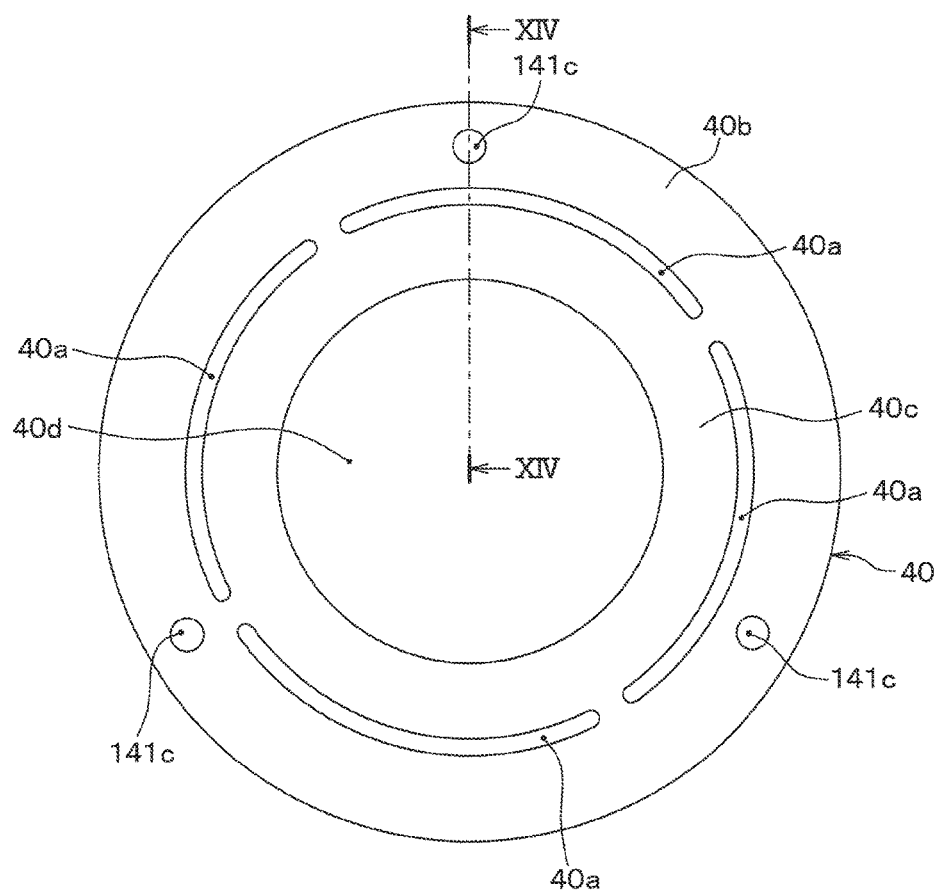
FIG. 15 is an axial view of an armature alone seen from the one axial side.

As shown in FIG. 14, similar to the blocking member 60 of the first embodiment, the blocking member 70 of the present embodiment is installed to the flat spring 45. Furthermore, as shown in FIG. 15, four through-holes 40a penetrate from the one end side to the other end side of the armature 40 of the present embodiment in the axial direction at the location between the ring members 40b, 40c.

Figure 16:
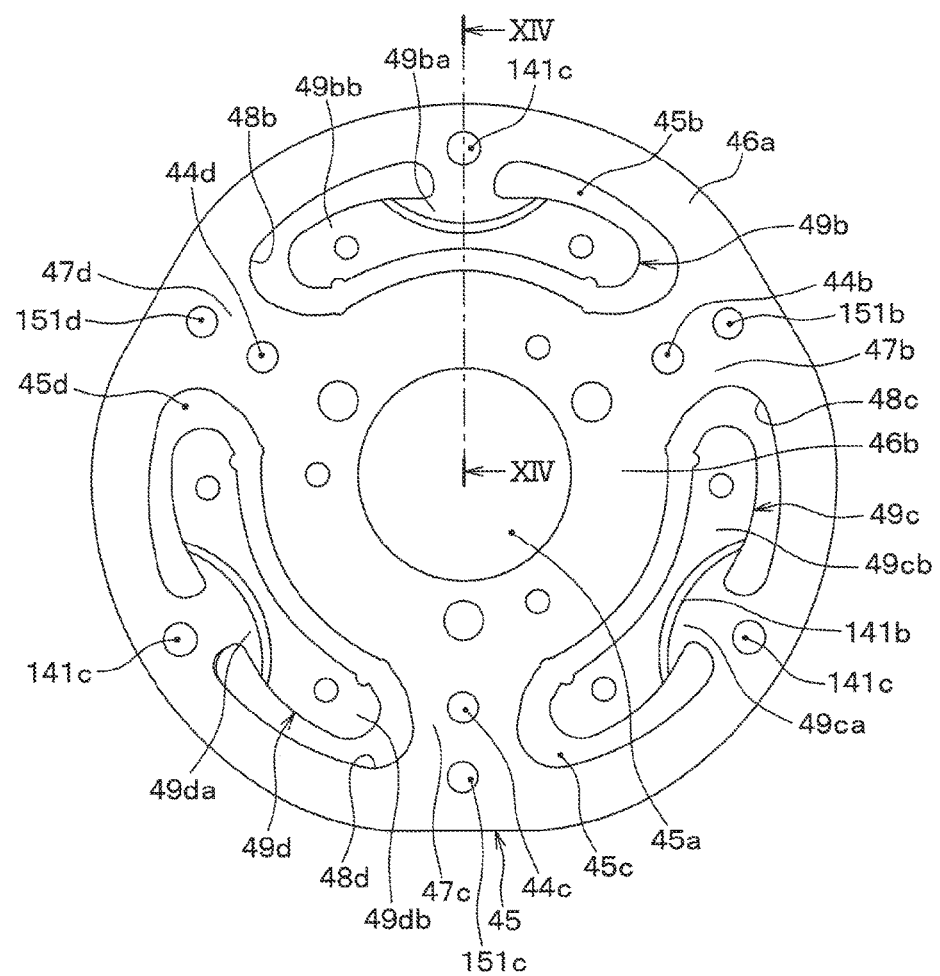
FIG. 16 is an axial view of a flat spring alone seen from the one axial side.
Figure 17:
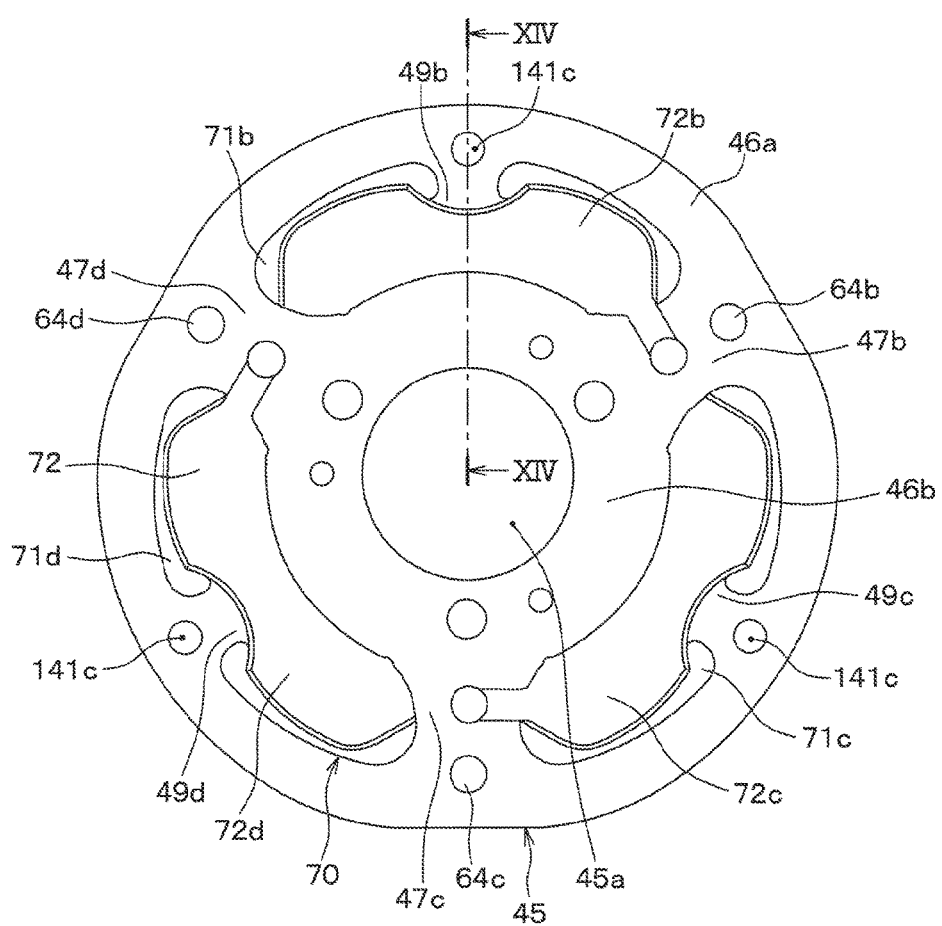
FIG. 17 is an axial view of the flat spring and a blocking member seen from the one axial side.
Figure 19:
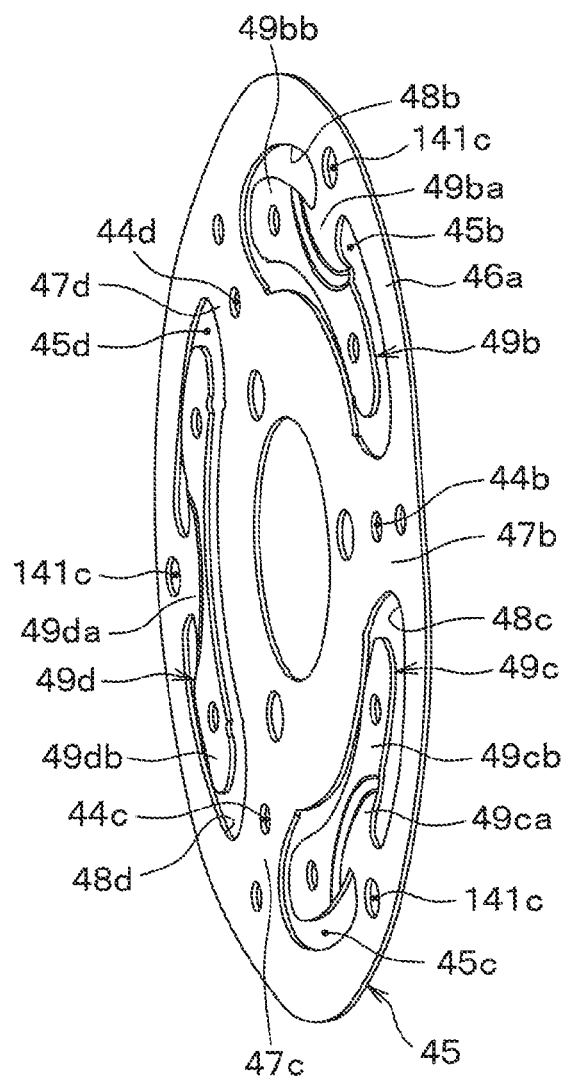
FIG. 19 is a perspective view of the flat spring alone seen from the one axial side.
Figure 20:
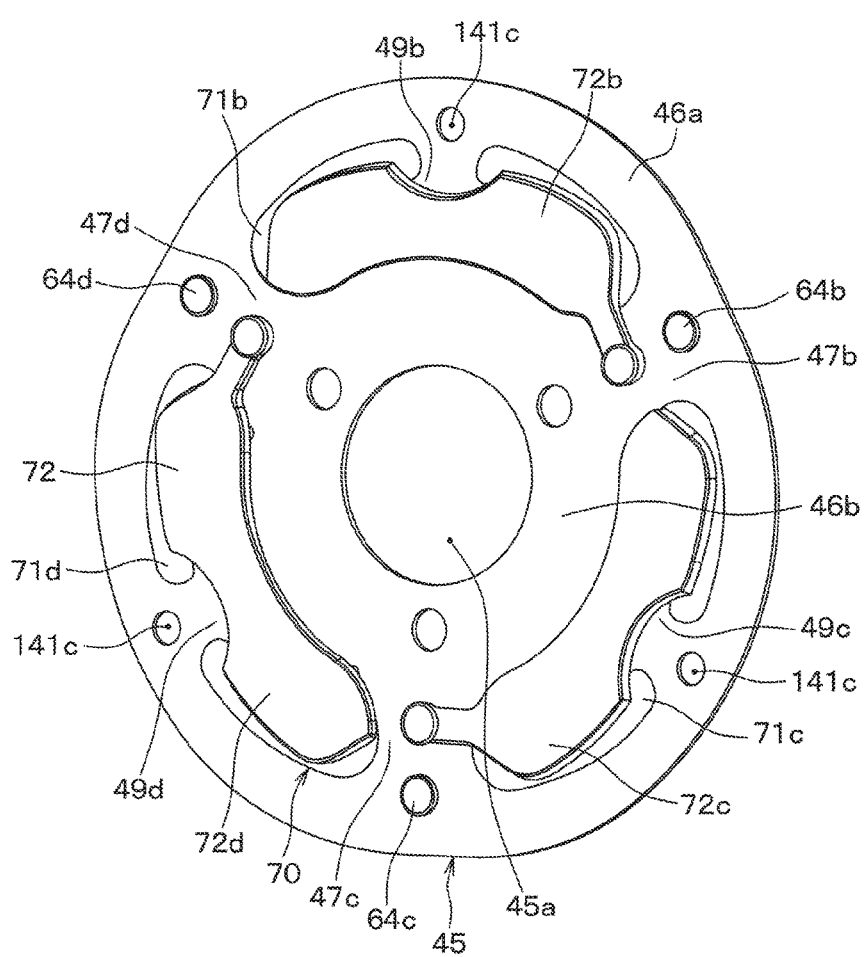
FIG. 20 is a perspective view of the flat spring and the blocking member seen from the one axial side.
Figure 21:
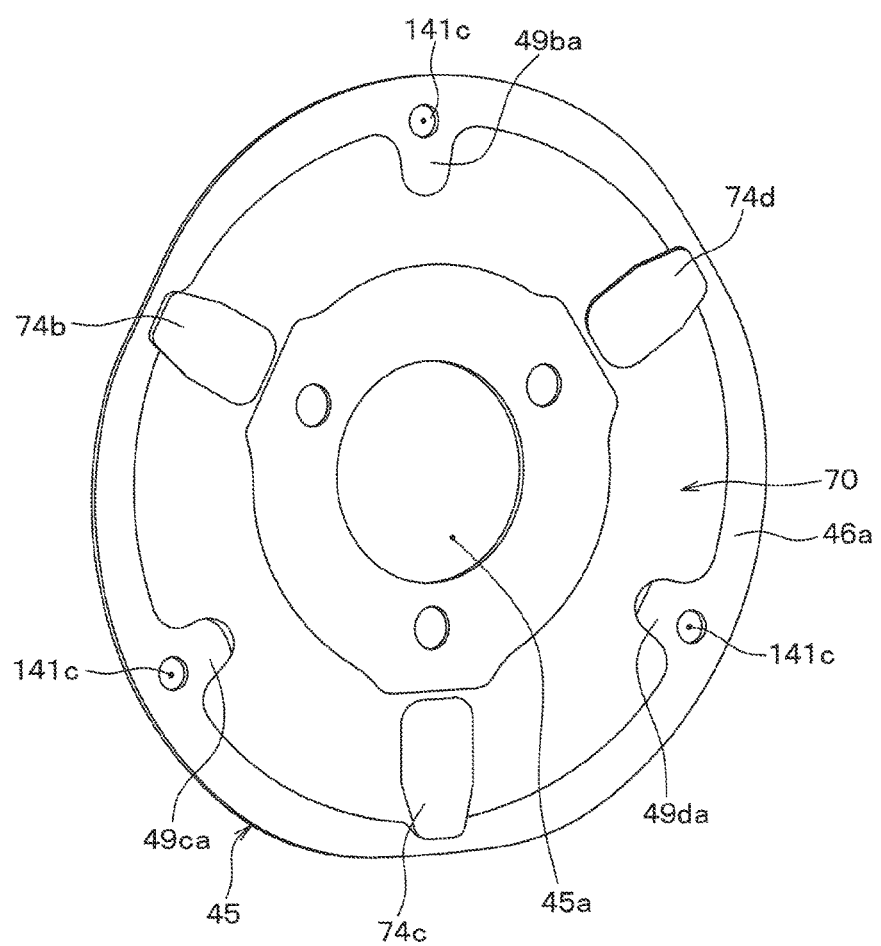
FIG. 21 is a perspective view of the flat spring and the blocking member seen from the other axial side.

Furthermore, as shown in FIGS. 16 and 19, the flat spring 45 of the present embodiment includes the constituent components 46a, 46b, 47b, 47c, 47d, 49b, 49c, 49d, which are similar to those of the first embodiment. The through-holes 45a, 45b, 45d, which are similar to those of the first embodiment, are formed at the flat spring 45. Furthermore, the rivet holes 141b for fixing the flat spring 45 and the armature 40 together are eliminated from the flat spring 45 of the present embodiment.

Also, as shown in FIGS. 14, 17, 18, 20 and 21, the blocking member 70, which closes the through-holes 45b, 45c, 45d, is installed to the flat spring 45. The blocking member 70 reduces a shock that is generated at the time of coupling between the armature 40 and the pulley 30. Furthermore, the blocking member 70 limits intrusion of a foreign object into a gap between the armature 40 and the pulley 30. As shown in FIGS. 18, 20, 21, 22, 23 and 24, the blocking member 70 includes the sub-blocking members 71b, 71c, 71d, 72b, 72c, 72d, 73, 74b, 74dc, 74d.

The sub-blocking members 71b, 71c, 71d are also referred to as main blocking portions 71b, 71c, 71d. The sub-blocking members 72b, 72c, 72d are also referred to as float cover portions 72b, 72c, 72d. The sub-blocking member 73 is also referred to as a flange portion 73. The sub-blocking members 74b, 74c, 74d are also referred to as armature-side thick wall portions 74b, 74c, 74d.

Figure 22:
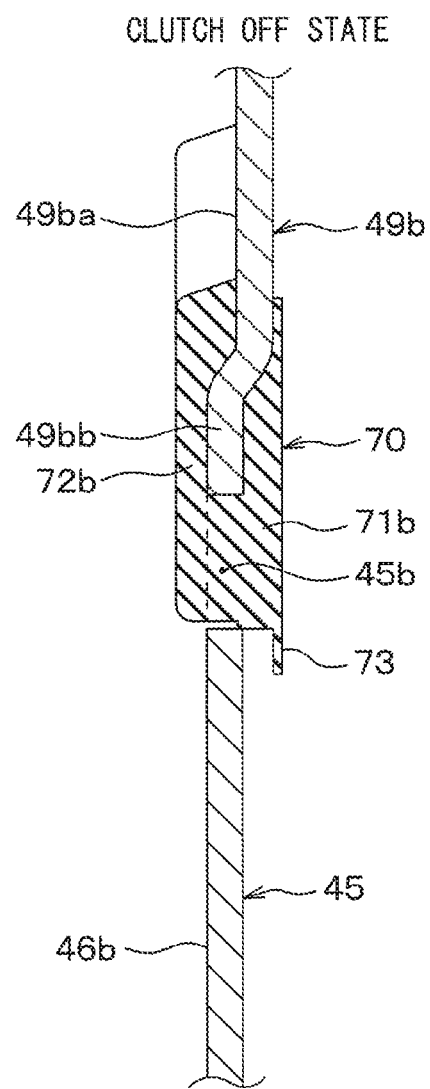
FIG. 22 is an enlarged cross-sectional view showing the blocking member at a clutch off time.
Figure 23:
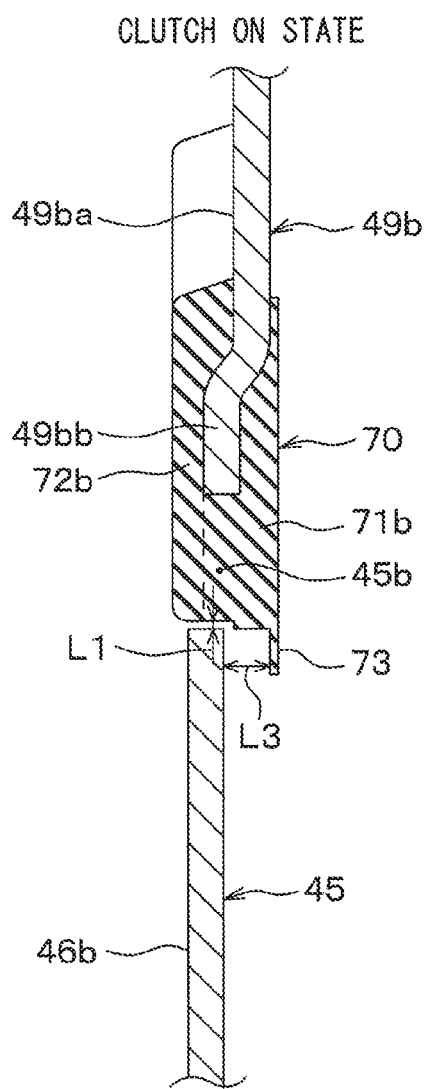
FIG. 23 is an enlarged cross-sectional view showing the blocking member at a clutch on state.
Figure 24:
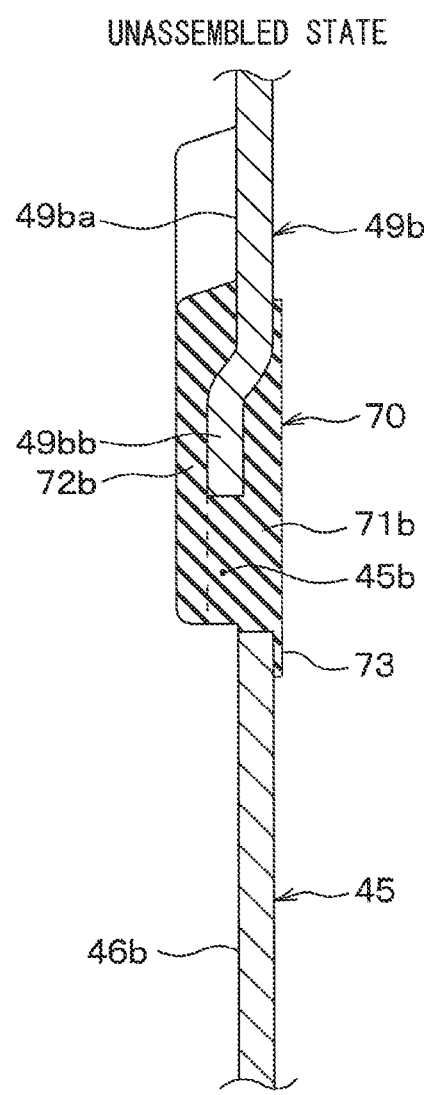
FIG. 24 is an enlarged cross-sectional view showing the blocking member in an unassembled state.

FIG. 22 is an enlarged cross-sectional view showing the blocking member 70 of FIG. 14 and its adjacent area in the clutch off state. FIG. 23 is an enlarged cross-sectional view showing the same portion as that of FIG. 22 in the clutch on state. FIG. 24 is an enlarged cross-sectional view showing the same portion of the flat spring 45 and the blocking member 70 as that of FIG. 22 in the unassembled state. In FIGS. 22, 23 and 24, a boundary between the main blocking portion 71b and the float cover portion 72b is indicated by a dotted line.

Each of the main blocking portions 71b, 71c, 71d is a member that is in a thin film form. The way of installing the main blocking portion 71b to the flat spring 45 is the same as the way of installing the main blocking portion 61b to the flat spring 45 of the first embodiment. Specifically, a part of the main blocking portion 71b is placed in the through-hole 45b and closes the through-hole 4513, Furthermore, another part of the main blocking portion 71b is placed between the floating part 49bb and the armature 40 and entirely covers the floating part 49bb from the other axial side. The other part of the main blocking portion 71b is pressed by the floating part 49bb and the armature 40 and is thereby compressed. The way of installing the main blocking portions 71c, 71d to the flat spring 45 is the same as the way of installing the main blocking portion 61c, 61d to the flat spring 45 of the first embodiment.

The way of installing the float cover portion 72b to the flat spring 45 is the same as the way of installing the float cover portion 62b to the flat spring 45 of the first embodiment. Specifically, the float cover portion 72b is joined to a surface of the main blocking portion 71b, which is located on the one axial side, and the float cover portion 72b projects from this surface of the main blocking portion 71b toward the one axial side. The float cover portion 72b entirely covers the floating part 49db from the one axial side. Furthermore, the float cover portion 72b extends from a location, at which the float cover portion 72b covers the island portion 49b, to the inside of the injection hole 44b along the one axial side of the bridge portion 47b, and the float cover portion 72b is joined to the flange portion 73 at the opening of the injection hole 44b on the other axial side. As discussed above, the floating part 49bb is clamped from the one axial side and the other axial side by the main blocking portion 71b and the float cover portion 72b. With the above construction, the vibration damping performance of the blocking member 70 is improved. The way of installing the float cover portion 72c, 72d to the flat spring 45 is the same as the way of installing the float cover portion 62c, 62d to the flat spring 45 of the first embodiment.

As shown in FIGS. 18, 22, 23, 24, the flange portion 73 projects from the outer peripheral end part of each of the main blocking portions 71b, 71c, 71d in a crossing direction that crosses the axial direction at a right angle. The flange portion 73 is shaped into a thin film form.

The shape of the flange portion 73 is generally the same as the shape of the flange portion 63 of the first embodiment. The relationship of the other members of the blocking member 70, the flat spring 45 and the armature 40 relative to the flange portion 73 is the same as the relationship of the other members of the blocking member 60, the flat spring 45 and the armature 40 relative to the flange portion 63 of the first embodiment.

Each of the armature-side thick wall portions 74b, 74c, 74d is placed on the other axial side of the corresponding bridge portion 47b, 47c, 47d and is joined to the flange portion 73 at an end part of the armature-side thick wall portion 74b, 74c, 74d in a direction perpendicular to the axial direction. The shape of the armature-side thick wall portion 74b, 74c, 74d is generally the same as the shape of the armature-side thick wall portion 64b, 64c, 64d of the first embodiment.

The relationship of the other sub-blocking members, the flat spring 45 and the armature 40 relative to the armature-side thick wall portions 74b, 74c, 74d is the same as the relationship of the other sub-blocking members, the flat spring 45 and the armature 40 relative to the armature-side thick wall portions 64b, 64c, 64d of the first embodiment.

Figure 18:
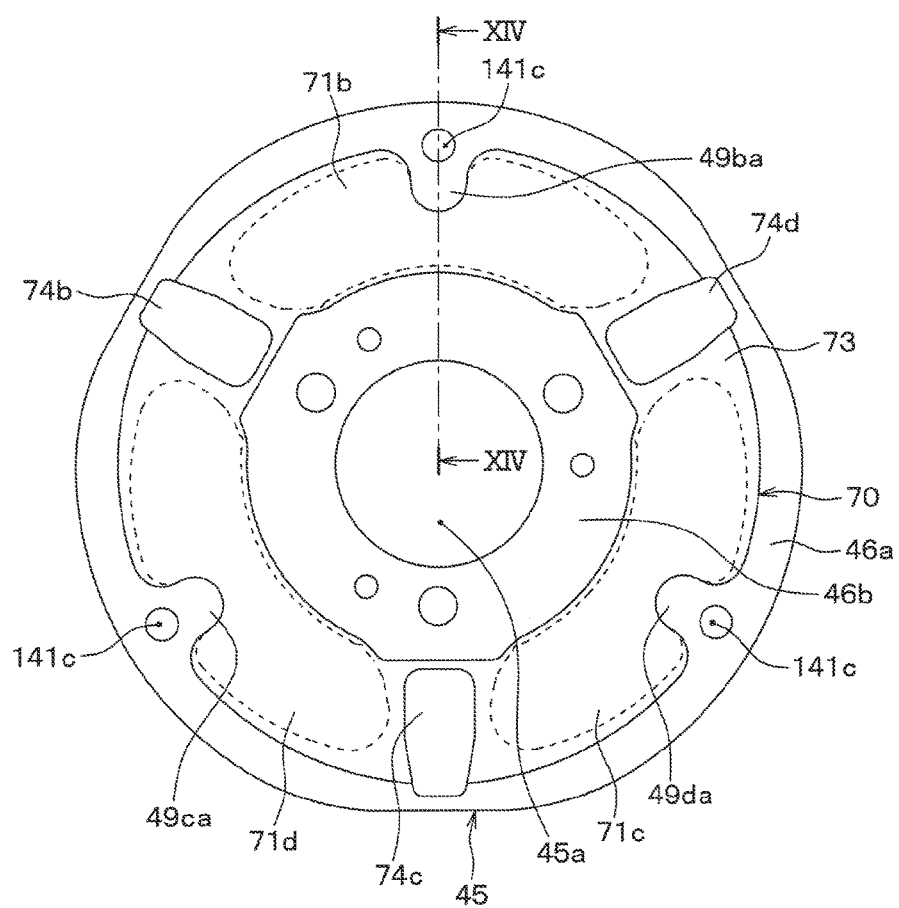
FIG. 18 is an axial view of the flat spring and a blocking member seen from the other axial side.
Figure 25:
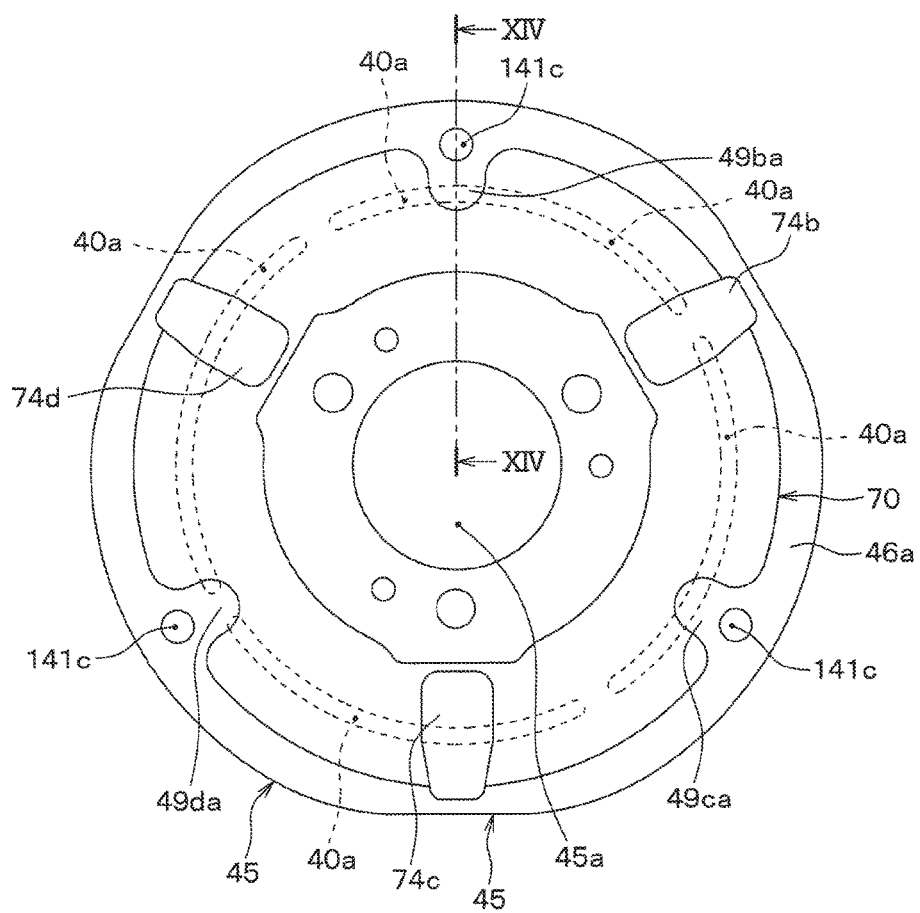
FIG. 25 is a view of the flat spring and the blocking member, onto which through-holes of the armature are projected.

Furthermore, with reference to FIG. 25, the sub-blocking members 71b, 71c, 71d, 73, 74b, 74c, 74d respectively cover corresponding portions of the through-holes 40a of the armature 40 from the one axial side. In FIG. 25, figures, which are formed by axially projecting outer peripheral edges of the through-holes 40a of the armature 40 onto a diagram that is the same as FIG. 18, are respectively indicated by dotted lines. Therefore, even when foreign objects enter the gap between the flat spring 45 and the armature 40, a possibility of intrusion of the foreign objects into the through-holes 40a is reduced.

In the clutch off state, unlike the unassembled state, the flat spring 45 is flexed in the axial direction along the circumferential direction about the axis S, as discussed above. In this way, the flange portion 73, which was in contact with the surface of the radially inner portion 46b of the flat spring 45 located on the other axial side in the unassembled state of FIG. 24, is spaced from the radially inner portion 46b toward the other axial side, as shown in FIG. 22.

Therefore, the surface of the part of each of the main blocking portions 71b, 71c, 71d, which have been opposed to and have been in contact with the outer peripheral end part of the radially inner portion 46b, is displaced relative to the outer peripheral end part of the radially inner portion 46b toward the other axial side in the clutch off state, as exemplified in FIG. 22. At this time, in the case of the example shown in FIG. 22, a segment of the inner peripheral end part of the main blocking portion 71b contacts the outer peripheral end part of the radially inner portion 46b. However, depending on the location and the situation, a gap may possibly be formed between the inner peripheral end part of the main blocking portion 71b and the outer peripheral end part of the radially inner portion 46b.

Furthermore, in the clutch on state, the amount of resilient deformation of the flat spring 45 is increased in comparison to the amount of resilient deformation of the flat spring 45 in the clutch off state. Therefore, a possibility of forming a gap between the inner peripheral end part of the main blocking portion 71b and the outer peripheral end part of the radially inner portion 46b shown in FIG. 23 is further increased. Even in the case where such a gap is formed, due to presence of the flange portion 73, which covers the outer peripheral end part of the radially inner portion 46b from the other axial side, the gap forms a labyrinth structure. Therefore, even when a foreign object intrudes from this gap to a location between the flat spring 45 and the armature 40, a possibility of further intrusion of the foreign object into the through-hole 40a of the armature 40 beyond the flange portion 73 is reduced.

Now, the shape of the blocking member 70 will be described in comparison to the shape of the blocking member 60 of the first embodiment with reference to FIGS. 22, 23 and 24. A radially inner end part of the main blocking portion 71b is further outwardly displaced in the radial direction of the axis S at the one axial side in comparison to the other axial side. However, the thickness of the radially inner portion 46b side end part of the main blocking portion 71b measured in the axial direction is increased in comparison to the main blocking portion 61b of the first embodiment.

Therefore, as shown in FIG. 23, in the clutch on state, the distance L3 is increased in comparison to the distance L1. Here, the distance L3 is a shortest distance measured in the axial direction from the end part (i.e., the outer peripheral end part) of the radially inner portion 46b, which is located on the through-hole 45b side, to the flange portion 73 in the clutch on state. The distance L1 is a shortest distance measured in the radial direction of the axis S from the outer peripheral end part of the radially inner portion 46b to the main blocking portion 71b in the clutch on state. A relationship, which is similar to the above-described relationship, also exists between the flange portion 63 and the main blocking portion 71c and also between the flange portion 63 and the main blocking portion 71d.

Because of the above-described construction, as shown in AG. 23, a gap, which is formed between the inner peripheral end part of the main blocking portion 71b and the outer peripheral end part of the radially inner portion 46b, can be reduced in the clutch on state.

The construction and the advantage of the main blocking portions 71b, 71c, 71d and the flange portion 73 discussed above are also implemented at the radially outer portion 46a side end part of each of the main blocking portions 71b, 71c, 71d. In the clutch on state, a distance H3 is larger than a distance H1. Here, the distance H3 is a shortest distance measured in the axial direction from the through-hole 45b, 45c, 45d side end part of the radially outer portion 46a to the flange portion 73 in the clutch on state. Furthermore, the distance H1 is a shortest distance measured in the radial direction from the through-hole 45b, 45c, 45d side end part of the radially outer portion 46a to the main blocking portion 71b, 71c, 71d.

Third Embodiment

In the first and second embodiments, there is described the example, in which the through-holes 45b, 45c, 45d of the flat spring 45 are covered by the blocking member 60. In the present embodiment, in place of this configuration, the through-holes 40a of the armature 40 are closed by a blocking member 60A. The present embodiment will be described with reference to FIG. 26.

Figure 26:
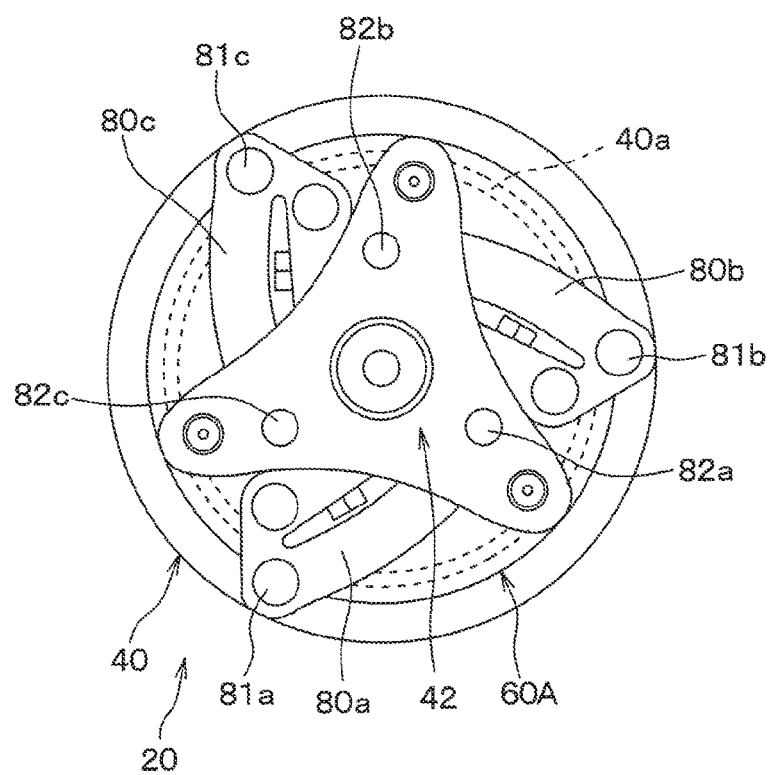
FIG. 26 is an axial view of a hub, a cushioning member and an armature of an electromagnetic clutch of a third embodiment seen from the one axial side.

FIG. 26 is an axial view of the electromagnetic clutch 20 of the present embodiment. In FIG. 26, the indication of the pulley 30 is omitted at the electromagnetic clutch 20, and the armature 40, flat springs 80a, 80b, 80c, the hub 42 and the blocking member 60A are indicated.

The electromagnetic clutch 20 of the present embodiment differs from the electromagnetic clutch 20 of the first and second embodiments with respect to the flat springs 80a, 80b, 80c and the blocking member 60A. Therefore, hereinafter, the flat springs 80a, 80b, 80c and the blocking member 60A will be described, and the description of the other structure, which is other than the flat springs 80a, 80b, 80c and the blocking member 60A, will be omitted for the sake of simplicity.

The blocking member 60A is provided in place of the blocking member 60 shown in FIG. 2. The blocking member 60A is shaped into a thin circular plate form that is centered at the axis S. The blocking member 60A is placed between the armature 40 and the flat springs 80a, 80b, 80c such that the blocking member 60A closes the three through-holes 40a (indicated by dotted lines) of the armature 40 from the one axial side (the front side of the plane of the FIG. 26, which is located on the front side in the direction perpendicular to the plane of FIG. 26).

The flat springs 80a, 80b, 80c are provided in place of the flat spring 45 in FIG. 26. Each of the flat springs 80a, 80b, 80c is formed by bending an elongated thin metal plate. The flat springs 80a, 80b, 80c are joined to the armature 40 through rivets 81a, 81b, 81c, respectively. The flat springs 80a, 80b, 80c are joined to the hub 42 through rivets 82a, 82b, 82c, respectively.

In this way, the flat springs 80a, 80b, 80c are joined to each of the hub 42 and the armature 40, The blocking member 60A of the present embodiment is fixed to each of the hub 42 and the armature 40.

According to the present embodiment discussed above, the blocking member 60A is placed between the armature 40 and the flat springs 80a, 80b, 80c such that the blocking member 60A closes the through-holes 40a of the armature 40 from the one axial side. In this way, it is possible to limit the intrusion of the foreign object into the gap between the armature 40 and the through-holes 40a in the electromagnetic clutch 20.

OTHER EMBODIMENTS (1) In the first and second embodiments, although there are described the examples, in each of which the vehicle drive engine 10 is used as the drive source, the present disclosure is not necessarily limited to this arrangement. For example, another device, which is other than the vehicle drive engine 10, may be used as the drive source.

(2) In the first and second embodiments, although there are described the examples, in each of which the compressor 2 is used as the drive-subject device, the present disclosure is not necessarily limited to this arrangement. For example, a device, which is other than the compressor 2, may be used as the drive-subject device.

(3) In the first and second embodiments, although there are described the examples, in which the through-holes 40a of the armature 40 overlap the through-holes 45b, 45c, 45d of the flat spring 45 in the axial direction, this construction may be modified such that the through-holes 40a of the armature 40 are offset from the through-holes 45b, 45c, 45d of the flat spring 45.

(4) In the first and second embodiments, although there are described the examples, in which the armature 40 is divided into the two ring members 40b, 40c by the arcuate through-holes 40a, the present disclosure is not necessarily limited to this arrangement. For example, in the armature 40, two or more arcuate through-holes may be offset from each other in the radial direction, so that the armature 40 is divided into three or more ring members.

Similarly, the present disclosure should not be limited to the case where the corresponding two arcuate through-holes 33a, 33b are offset in the radial direction in the pulley 30. For instance, three or more arcuate through-holes may be offset from each other in the radial direction.

(5) In the above embodiments, the blocking member 60, 70, 60A is formed as the one-piece member. Alternatively, the blocking member 60, 70, 60A may be formed by a plurality of separate members.

(6) Although the blocking member entirely closes the secondary through-holes, the blocking member may close only a portion of one or more of the secondary through-holes. Even in such a case, the advantage of excluding the foreign objects can be achieved to some extent. That is, as long as the blocking member closes the portion of the one or more of the secondary through-holes, a certain degree of the advantage discussed above can be achieved.

(7) In the above embodiments, the flange portion 63 projects from the outer peripheral end part of each of the main blocking portions 61b, 61c, 61d in the crossing direction, which crosses the axial direction at the right angle. Furthermore, the flange portion 73 projects from each of the outer peripheral end parts of the main blocking portions 71b, 71c, 71d in the crossing direction, which crosses the axial direction at the right angle.

Alternatively, the flange portion 63 may project from the outer peripheral end part of each of the main blocking portions 61b, 61c, 61d in a crossing direction, which crosses the axial direction at an angle that is other than the right angle. Also, the flange portion 73 may project from the outer peripheral end part of each of the main blocking portions 71b, 71c, 71d in a crossing direction, which crosses the axial direction at an angle that is other than the right angle.

(8) The present disclosure should not be limited to the above embodiments, and the above embodiments may be modified in various appropriate ways. The above embodiments are not necessarily unrelated to each other and can be combined in any appropriate combination unless such a combination is obviously impossible. The constituent component(s) of each of the above embodiments is/are not necessarily essential unless it is specifically stated that the constituent component(s) is/are essential in the above embodiment, or unless the component(s) is/are obviously essential in principle.

Furthermore, in each of the above embodiments, in the case where the number of the component(s), the value, the amount, the range, and/or the like is specified, the present disclosure is not necessarily limited to the number of the component(s), the value, the amount, and/or the like specified in the embodiment unless the number of the component(s), the value, the amount, and/or the like is indicated as indispensable or is obviously indispensable in view of the principle of the present disclosure. Furthermore, in each of the above embodiments, in the case where the shape of the component(s) and/or the positional relationship of the component(s) are specified, the present disclosure is not necessarily limited to the shape of the component(s) and/or the positional relationship of the component(s) unless the embodiment specifically states that the shape of the component(s) and/or the positional relationship of the component(s) is/are necessary or is/are obviously essential in principle.

The invention claimed is:

1. An electromagnetic clutch that transmits a rotational drive force, which is outputted from a drive source, to a drive-subject device, the electromagnetic clutch comprising:
    a driving-side rotatable body that is rotated about an axis of a rotatable shaft of the drive-subject device by the rotational drive force;
    a driven-side rotatable body that is placed on one side of the driving-side rotatable body in an axial direction of the axis, wherein the driven-side rotatable body is formed to be rotatable about the axis;
    a flat spring that is shaped into a plate form and is formed to be rotatable integrally with the rotatable shaft of the drive-subject device, wherein the flat spring is joined to the driven-side rotatable body; and
    a blocking member that is installed to the flat spring, wherein:
    the driven-side rotatable body has a primary through-hole, which is formed to extend through the driven-side rotatable body from one end side to another end side of the driven-side rotatable body in the axial direction;
    the flat spring has a secondary through-hole, which is formed to extend through the flat spring from one end side to another end side of the flat spring in the axial direction;
    switching between coupling and decoupling of the driven-side rotatable body relative to the driving-side rotatable body is made through elastic deformation of the flat spring in response to switching between generation and loss of a magnetic circuit that passes through a radially inner side of the primary through-hole in the driven-side rotatable body, the driving-side rotatable body, and a radially outer side of the primary through-hole in the driven-side rotatable body;
    the blocking member closes the secondary through-hole;
    the blocking member includes:
        a main blocking portion that closes at least a portion of the secondary through-hole, and
        a flange portion that projects from the main blocking portion in a direction, which crosses the axial direction; and
    the flange portion is placed between the flat spring and the driven-side rotatable body and overlaps an end portion of the flat spring, which is located at the secondary through-hole side of the flat spring, in the axial direction.

2. The electromagnetic clutch according to claim 1, wherein a portion of the main blocking portion is clamped between the flat spring and the driven-side rotatable body.

3. The electromagnetic clutch according to claim 1, wherein
    the primary through-hole and the secondary through-hole overlap each other in the axial direction.

4. The electromagnetic clutch according to claim 1, wherein
    the main blocking portion and the flange portion are formed integrally in one-piece.

5. The electromagnetic clutch according to claim 1, wherein
    in a clutch on state, in which the driving-side rotatable body and the driven-side rotatable body are coupled with each other, a shortest distance, which is measured in the axial direction from the end portion of the flat spring located on the secondary through-hole side of the flat spring to the flange portion, is longer than a shortest distance, which is measured in a radial direction from the end portion of the flat spring located on the secondary through-hole side of the flat spring to the main blocking portion.

6. The electromagnetic clutch according to claim 1, wherein
    the flange portion is displaceable relative to the end portion of the flat spring in the axial direction.

7. The electromagnetic clutch according to claim 1, wherein:
    the blocking member includes a projecting portion that is joined to a surface of the main blocking portion, which is opposite to the driven-side rotatable body in the axial direction, and
    the projecting portion projects from the secondary through-hole away from the driven-side rotatable body in the axial direction.

* * * * *